United States Patent
Kim et al.

(10) Patent No.: US 8,896,578 B2
(45) Date of Patent: Nov. 25, 2014

(54) MOBILE TERMINAL AND METHOD OF CONTROLLING THE SAME

(75) Inventors: Minjoo Kim, Seoul (KR); Byoungnam Lee, Seoul (KR); Inyoung Hwang, Seoul (KR); Meeyeon Choi, Seoul (KR); Hyunsuk Jung, Seoul (KR); Youri Shin, Seoul (KR); Minhun Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 386 days.

(21) Appl. No.: 13/088,114

(22) Filed: Apr. 15, 2011

(65) Prior Publication Data

US 2011/0267316 A1 Nov. 3, 2011

(30) Foreign Application Priority Data

May 3, 2010 (KR) .......... 10-2010-0041560
May 3, 2010 (KR) .......... 10-2010-0041562

(51) Int. Cl.

| G06F 3/033 | (2013.01) |
|---|---|
| G06F 3/042 | (2006.01) |
| G06F 1/16 | (2006.01) |
| G06F 3/0354 | (2013.01) |
| G06F 3/0346 | (2013.01) |
| H04M 1/02 | (2006.01) |
| H04M 1/725 | (2006.01) |

(52) U.S. Cl.
CPC .......... *H04M 1/0285* (2013.01); *H04M 1/0241* (2013.01); *G06F 3/0426* (2013.01); *G06F 1/1643* (2013.01); *H04M 1/0264* (2013.01); *H04M 2250/12* (2013.01); *G06F 1/1639* (2013.01); *H04M 2250/52* (2013.01); *H04M 2250/70* (2013.01); *G06F 3/03542* (2013.01); *G06F 1/1673* (2013.01); *H04M 1/72552* (2013.01); *G06F 3/0346* (2013.01); *G06F 3/03545* (2013.01); *H04M 2250/22* (2013.01); *G06F 3/0425* (2013.01); *G06F 1/1694* (2013.01); *H04M 1/0272* (2013.01)
USPC .......... 345/179; 345/175; 178/18.01

(58) Field of Classification Search
CPC . G06F 3/03545; G06F 3/0425; G06F 3/0386; G06F 17/30861; G06F 1/1616; G06F 2203/04807; G06F 3/033; G06F 3/042; G03B 21/14
USPC ............ 345/156–184, 419; 178/18.01, 19.01, 178/20.01
See application file for complete search history.

(56) References Cited

U.S. PATENT DOCUMENTS

| 5,754,645 A | 5/1998 | Metroka et al. |
|---|---|---|
| 6,215,480 B1 | 4/2001 | Danis et al. |

(Continued)

FOREIGN PATENT DOCUMENTS

| DE | 102008027746 | 12/2009 |
|---|---|---|
| EP | 1396981 | 3/2004 |

(Continued)

*Primary Examiner* — William Boddie
*Assistant Examiner* — Mansour M Said
(74) *Attorney, Agent, or Firm* — Lee, Hong, Degerman, Kang & Waimey

(57) ABSTRACT

A mobile terminal is presented. The mobile terminal includes an elongated body having a central axis and being structured to form an outer side having a circumference, an end portion located at one end of the elongated body, a touch screen coupled to the body, a projector positioned at the end portion and being configured to project an image onto a surface, and a camera coupled to the elongated body and being positioned to capture at least a portion of the image projected onto the surface.

15 Claims, 30 Drawing Sheets

(56) References Cited

U.S. PATENT DOCUMENTS

| | | | |
|---|---|---|---|
| 2003/0117368 A1* | 6/2003 | Pedersen | 345/156 |
| 2005/0057534 A1* | 3/2005 | Charlier | 345/179 |
| 2005/0264525 A1* | 12/2005 | Adams et al. | 345/156 |
| 2006/0077188 A1* | 4/2006 | Byun | 345/179 |
| 2008/0018591 A1* | 1/2008 | Pittel et al. | 345/156 |
| 2009/0153367 A1 | 6/2009 | Lee | |
| 2010/0033352 A1 | 2/2010 | Chuang et al. | |

FOREIGN PATENT DOCUMENTS

| | | |
|---|---|---|
| GB | 2321694 | 8/1998 |
| WO | 2010017696 | 2/2010 |

* cited by examiner

MOBILE TERMINAL AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Application Nos. 10-2010-0041560, filed on May 3, 2010, and 10-2010-0041562, filed on May 3, 2010 the contents of which are hereby incorporated by reference herein in their entirety.

BACKGROUND OF THE INVENTION

1. Field of the Invention

The present invention relates to a mobile terminal and a control method thereof. Specifically, to a mobile terminal and a control method for capturing an image of a user's gesture and selectively activating various modes associated with the captured image.

2. Discussion of the Related Art

A mobile terminal is a device which may be configured to perform various functions. Examples of such functions include data and voice communications, capturing images and video via a camera, recording audio, outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. Additionally, the mobile terminals can be further classified into handheld terminals and vehicle mount terminals according to their portability.

There are ongoing efforts to support and increase the functionality of mobile terminals. Such efforts include software and hardware improvements, as well as changes and improvements in the structural components which form the mobile terminal.

To support and enhance functions of a terminal a variety of recent terminals have provided functions such as motion capture and gesture capture.

SUMMARY

In accordance with an embodiment. A mobile terminal is presented. The mobile terminal includes an elongated body having a central axis and being structured to form an outer side having a circumference, an end portion located at one end of the elongated body, a touch screen coupled to the body, wherein the touch screen is positioned relative to the elongated body to cooperatively form at least a portion of the outer side of the elongated body, and wherein the touch screen is configured to receive user input responsive to contact with the touch screen, a projector positioned at the end portion and being configured to project an image onto a surface, and a camera coupled to the elongated body and being positioned to capture at least a portion of the image projected onto the surface, wherein the captured image permits detection of user contact with the surface at a location that is associated with a particular portion of the projected image.

According to one feature, the elongated body includes a first body and a second body connected with each to permit relative rotation between the first body and the second body.

According to another feature, the mobile terminal further includes a controller for controlling a first image displayed via the projector to be different from a second image displayed on the touch screen.

According to yet another feature, the mobile terminal further includes a motion sensor module, disposed on the elongated body, configured to detect a movement of the elongated body. Additionally, the mobile terminal further includes a controller for displaying characters on the touch screen corresponding to the movement of the elongated body.

According to still yet another feature, the camera is arranged to face a direction in which the projector projects the image. Additionally, a controller activates the camera when a character input mode is activated. Furthermore, an optical axis of the projected image is substantially parallel to the central axis.

In accordance with another embodiment a mobile terminal is presented. The mobile terminal includes a body, a projector, disposed on one end of the body, configured to project an image, a motion sensor configured to detect a movement of the body, a camera configured to detect an input on the image projected via the projector, and a controller configured to receive characters via the input detected by the camera to activate a first character input mode, and configured to receive characters via the operation of the motion sensor to activate a second character input mode, wherein the controller receives the characters via the input on virtual keys projected by the projector in the first character input mode, and wherein the controller receives the characters via a movement of the body in the second character input mode.

In accordance with yet another embodiment a method of controlling a mobile terminal is presented. The method includes responsive to user input selecting a first character input mode or a second character input mode, and obtaining characters input by a user via the selected first character input mode or the selected second character input mode, wherein the first character input mode receives the characters based on an input received on a virtual keyboard and the second character input mode receives the characters based on a motion of the mobile terminal.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes "module," "unit," and "part" are used for elements in order to facilitate the disclosure only. Therefore, significant meanings or roles are not given to the suffixes themselves and it is understood that the "module," "unit," and "part" can be used together or interchangeably.

Mobile terminals described in this disclosure can include a mobile phone, a smart phone, a laptop computer, a digital broadcast terminal, a PDA (personal digital assistant), a PMP (portable multimedia player), and a navigation system.

Figure 1:
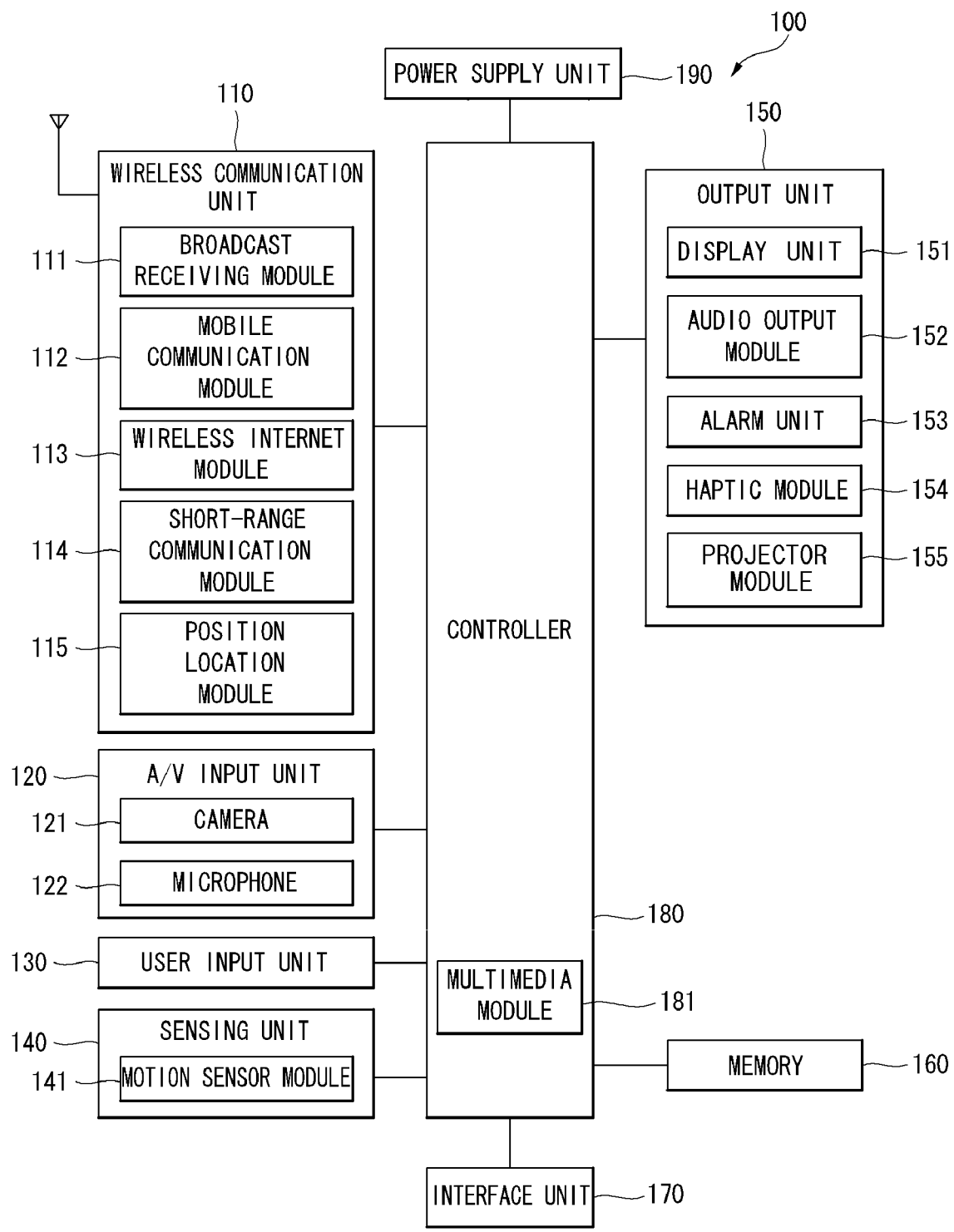
FIG. 1 is a block diagram of a mobile terminal according to an embodiment of the present invention.

FIG. 1 is a block diagram of a mobile terminal 100 according to one embodiment of the present invention. As illustrated in FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and/or a terrestrial channel.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal and/or broadcast associated information received by the broadcast receiving module 111 may be stored in a suitable device, such as a memory 160.

The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of a digital multimedia broadcasting (DMB) system and an electronic service guide (ESG) of a digital video broadcast-handheld (DVB-H).

The broadcast receiving module 111 may be configured to receive broadcast signals transmitted from various types of broadcast systems. By nonlimiting example, such broadcasting systems may include a digital multimedia broadcasting-terrestrial (DMB-T) system, a digital multimedia broadcasting-satellite (DMB-S) system, DVB-H, the data broadcasting system known as media forward link only (MediaFLO™) and an integrated services digital broadcast-terrestrial (ISDB-T) system. Optionally, the broadcast receiving module 111 can be configured to be suitable for other broadcasting systems as well as the above-noted digital broadcasting systems.

The mobile communication module 112 transmits/receives wireless signals to/from one or more network entities (e.g., a base station, an external terminal, and/or a server). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi- Fi, Wibro (Wireless broadband), Wimax (World Interoperability for Microwave Access), and HSDPA (High Speed Downlink Packet Access).

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module.

As illustrated in FIG. 1, the audio/video (A/V) input unit 120 is configured to provide audio or video signal input to the mobile terminal 100. As shown, the A/V input unit 120 includes a camera 121 and a microphone 122. The camera 121 receives and processes (or produces) image frames of still pictures or video, which are obtained by an image sensor in a video call mode or a photographing mode. Furthermore, the processed image frames can be displayed on the display unit 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition mode. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply 190, and the presence or absence of a coupling or other connection between the interface unit 170 and an external device. According to one embodiment, the sensing unit 140 can include a motion sensor 142.

The motion sensor 142 detects a body motion of the mobile terminal 100. The motion sensor 142 outputs a signal corresponding to the detected body motion to the controller 180.

The output unit 150 generates output relevant to the senses of sight, hearing, and touch. Furthermore, the output unit 150 includes the display unit 151, an audio output module 152, an alarm unit 153, a haptic module 154, and a projector module 155.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented as a transparent or optically transmissive type, i.e., a transparent display. A representative example of the transparent display is a TOLED (transparent OLED). A rear configuration of the display unit 151 can be implemented as the optically transmissive type as well. In this configuration, a user may be able to see an object located at the rear of a terminal body on a portion of the display unit 151 of the terminal body.

At least two display units 151 can be provided in the mobile terminal 100 in accordance with one embodiment of the mobile terminal 100. For instance, a plurality of display units can be arranged to be spaced apart from each other or to form a single body on a single face of the mobile terminal 100. Alternatively, a plurality of display units can be arranged on different faces of the mobile terminal 100.

If the display unit 151 and a sensor for detecting a touch action (hereinafter referred to as a "touch sensor") is configured as a mutual layer structure (hereinafter referred to as a "touchscreen"), the display unit 151 is usable as an input device as well as an output device. In this case, the touch sensor can be configured as a touch film, a touch sheet, or a touchpad.

The touch sensor can be configured to convert pressure applied to a specific portion of the display unit 151 or a variation of capacitance generated from a specific portion of the display unit 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display unit 151 is touched.

As illustrated in FIG. 1, a motion sensor module 141 can be provided at an internal area of the mobile terminal 100. The motion sensor module can sense a variation in the position of the mobile terminal 100. Position variations may include a variation in the angle between the mobile terminal 100 and the ground, or a movement of the mobile terminal 100 from a first point to a second point. The motion sensor module 141 may be set in the mobile terminal 100 or provided to multiple points inside the mobile terminal 100, which will be described in detail later. The motion sensor module 141 may further include an acceleration sensor or a GPS sensor.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations thereof.

The alarm unit 153 outputs a signal for announcing the occurrence of a particular event associated with the mobile terminal 100. Typical events include a call received, a message received and a touch input received. The alarm unit 153 is able to output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 is able to generate various tactile effects in addition to the vibration. For instance, the haptic module 154 may generate an effect attributed to an arrangement of pins vertically moving against a contacted skin surface, an effect attributed to an injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with one embodiment of the mobile terminal 100.

The projector module 155 is an element for performing an image projector function using the mobile terminal 100. The projector module 155 is able to display an image, which is identical to or at least partially different from the image displayed on the display unit 151, on an external screen or wall according to a control signal of the controller 180.

In particular, the projector module 155 can include a light source generating light (e.g., a laser) for projecting an external image, an image producing means for producing an external image to project using the light generated from the light source, and a lens for enlarging the external image according to a predetermined focal distance. Furthermore, the projector module 155 can further include a device for adjusting an image projection direction by mechanically moving the lens or the whole module.

The projector module 155 can be a CRT (cathode ray tube) module, an LCD (liquid crystal display) module, or a DLP (digital light processing) module according to a device type. In particular, the DLP module is operated by enabling the light generated from the light source to reflect on a DMD (digital micro-mirror device) chip and can be advantageous for reducing the size of the projector module 155.

Preferably, the projector module 155 can be provided in a lengthwise direction of a lateral, front or backside direction of the mobile terminal 100. Furthermore, it is understood that the projector module 155 can be provided in any portion of the mobile terminal 100 as deemed necessary.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures, and moving pictures. Furthermore, a recent use history or a cumulative use frequency of each data (e.g., use frequency for each phonebook, each message or each multimedia file) can be stored in the memory 160. Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, or XD memory), or other similar memory or data storage device. Furthermore, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identity Module (UIM), a Subscriber Identity Module (SIM), and/or a Universal Subscriber Identity Module (USIM). A device having the identity module (hereinafter referred to as an "identity device") can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
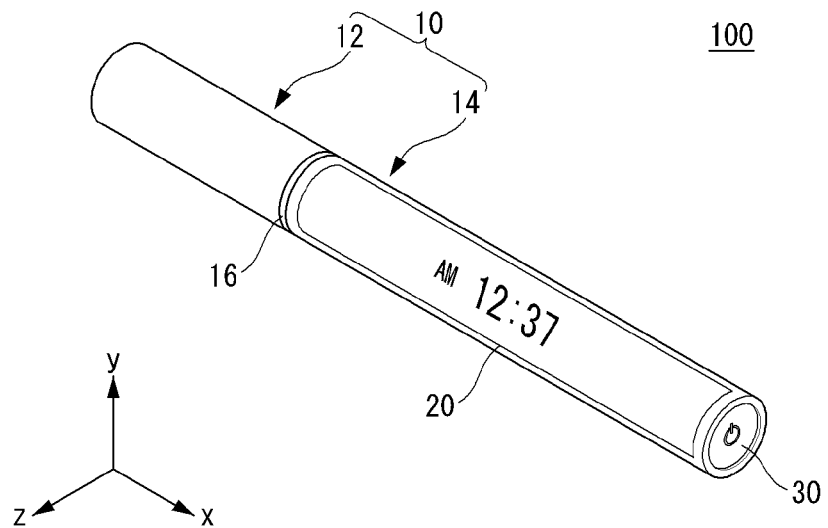
FIG. 2 illustrates the mobile terminal according to an embodiment of the present invention.

FIG. 2 is a perspective view of an implementation of the mobile terminal 100 illustrated in FIG. 1.

As illustrated in FIG. 2, the mobile terminal 100 may include a stick body 10, a touch screen 20 provided on the external circumference of the stick body 10, and an input button 30 provided on one end of the stick body 10.

The stick body 10 may have a cylindrical shape elongated in an axial direction. The axial length of the cylinder is greater than the radial direction of the cylinder. The cylindrical shape allows for the stick body 10 to be rotated. The stick body 10 is divided into a first stick body 12 and a second stick body 14. The first and second stick bodies 12 and 14 may be rotatable.

The first and second stick bodies 12 and 14 may be arranged in parallel in the axial direction. In addition, one of the first or second stick bodies 12 and 14 can rotate with respect to the other. For example, the user can hold the first and second stick bodies 12 and 14 with both hands and rotate the first stick body 12 clockwise or counterclockwise.

Additionally, for example, when the controller 180 receives a signal associated with the clockwise or counterclockwise rotation of the first stick body 12, the controller may perform a specific operation, such as selecting a specific item or changing the current displayed image.

A ring-shaped spacer 16 may be interposed between the first and second stick bodies 12 and 14 to enable a smooth rotation of the first and second stick bodies 12 and 14.

The touch screen 20 may be located on the external circumference of the stick body 10 and may be in a cylindrical form. The touch screen 20 may be partially or fully provided on the external circumference of the stick body 10. The touch screen 20 may correspond to the output unit 150 and to the user input unit 130.

The input button 30 may be provided on one end of the stick body 10. A physical input may be received via the input button 30. Specifically, the input button 30 may generate a signal when pressed. The controller 180 can receive the signal generated by the input button 30 and perform a specific operation corresponding to the signal, such as an operation for changing the display of the touch screen 20.

Figure 3:
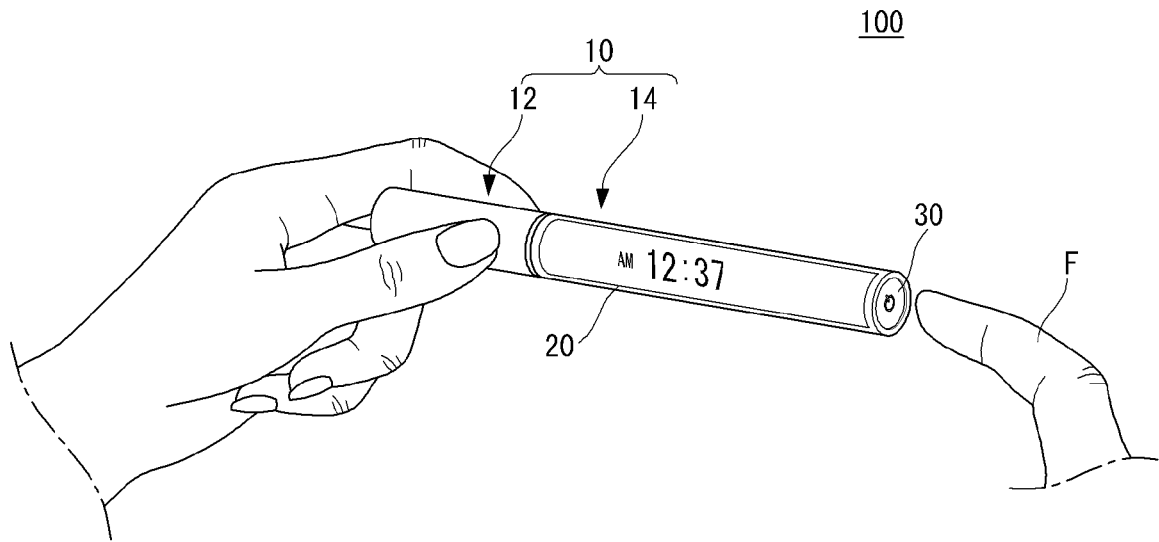
FIG. 3 illustrates an example of operating the mobile terminal according to an embodiment of the present invention.

FIG. 3 illustrates an example of operating the mobile terminal 100 according to an embodiment of the present invention. As previously discussed, the mobile terminal 100 can perform a specific operation in response to an input received via the input button 30.

As illustrated in FIG. 3, touch screen 20 may display the current time. Additionally, the touch screen 20 may display a wallpaper until the user executes a specific operation of the mobile terminal 100 via an input on the input button 30 (not shown). The touch screen 20 may also display the current time while displaying the wallpaper (not shown).

Figure 4:
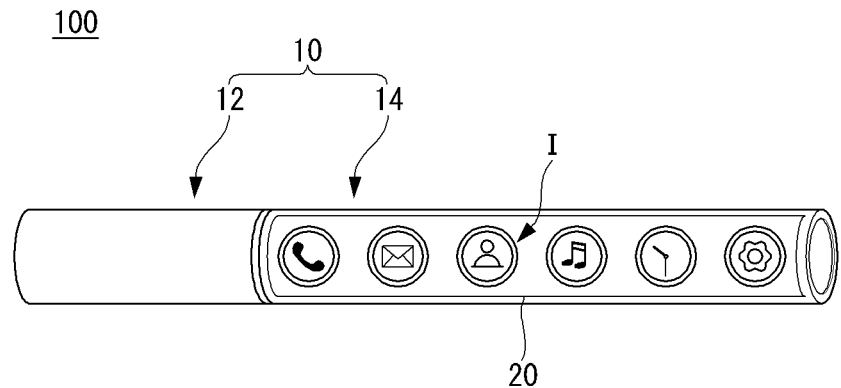
FIG. 4 illustrates a touch screen image displayed according to an embodiment of the present invention.

FIG. 4 illustrates a touch screen image displayed according to an embodiment of the present invention. As illustrated in FIG. 4, the controller 180 can display icons I on the touch screen 20 in response the input button 30 being pressed. The displayed icons I may correspond to functions of the mobile terminal 100. Although FIG. 4 illustrates displaying the icon display screen when the input button 30 is pressed, the function for displaying the icon display screen is not limited to pressing the input button 30.

Figure 5:
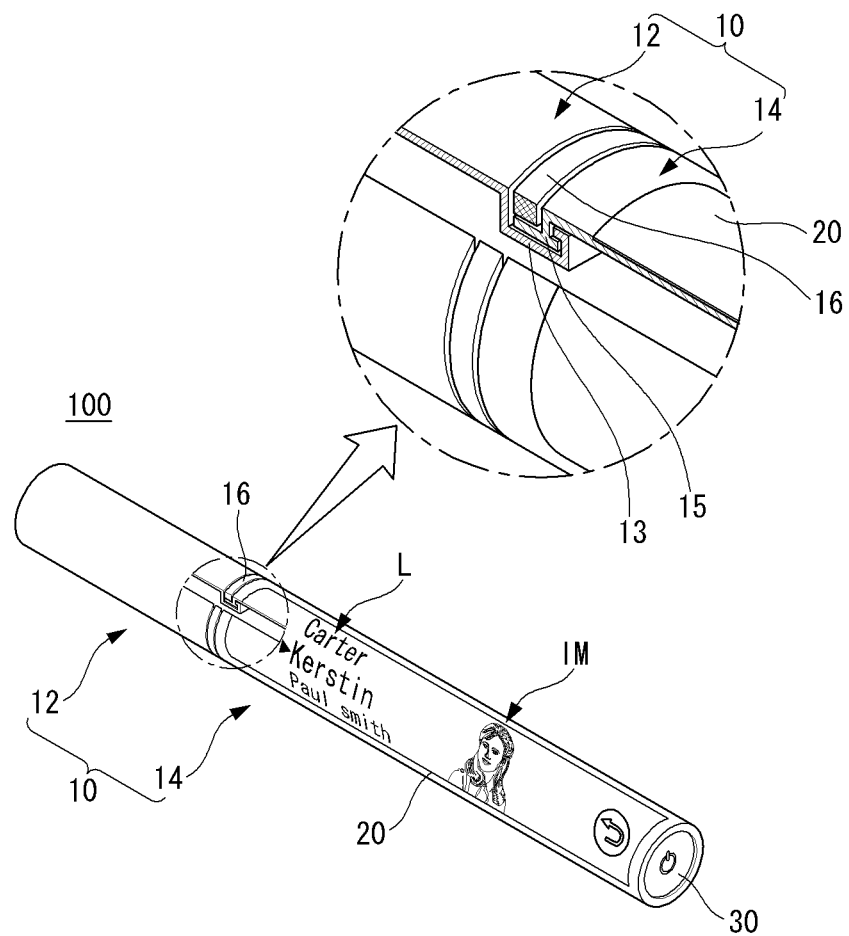
FIG. 5 illustrates the mobile terminal according to an embodiment of the present invention.

FIG. 5 is a partial cut view of the mobile terminal 100 illustrated in FIG. 2.

As illustrated in FIG. 5, the first and second stick bodies 12 and 14 may, respectively, include first and second combining structures 13 and 15. The first combining structure 13 extends from the first stick body 12 and the second combining structure 15 extends from the second stick body 14. The first and second combining structures 13 and 15 may be, respectively, convex and concave structures corresponding to each other. When the first and second combining structures 13 and 15 are combined, the first and second stick bodies 12 and 14 can rotate with respect to each other. The spacer 16 may be interposed between the first and second stick bodies 12 and 14.

The spacer 16 may be a ring surrounding the stick body 10. The spacer 16 interposed between the first and second stick bodies 12 and 14 can prevent friction and wear between the first and second stick bodies 12 and 14.

Figure 6:
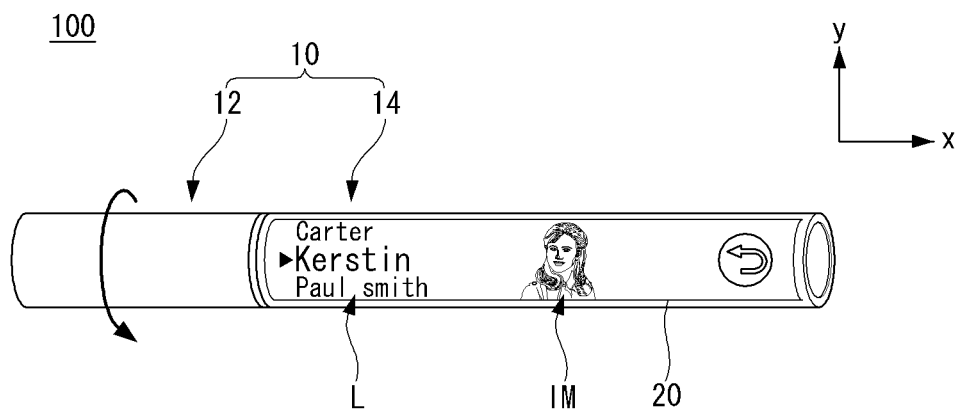
FIGS. 6 to 9 illustrate an operation of the mobile terminal according to various embodiments of the present invention.
Figure 7:
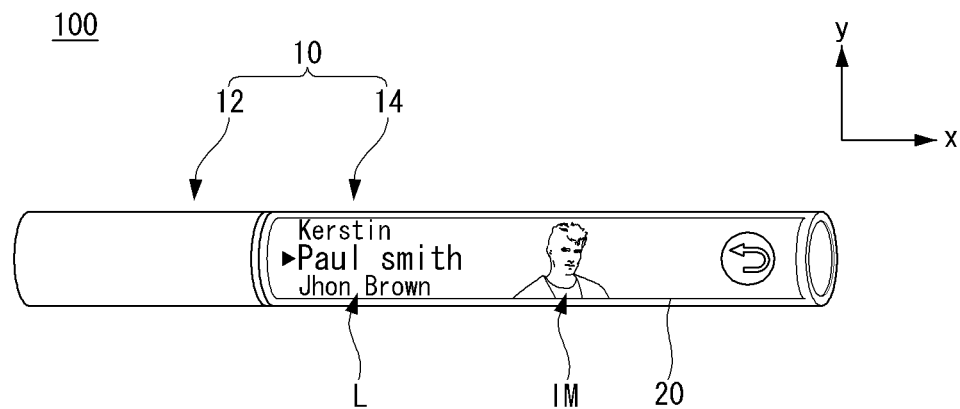

FIGS. 6 and 7 illustrate an operation of the mobile terminal 100 illustrated in FIG. 2. As illustrated in FIG. 6, the touch screen 20 of the second stick body 14 may display a specific image. The specific image may include a list L of selectable items. For example, the touch screen 20 can display the list L of contacts stored in the mobile terminal 100.

The user can rotate the first stick body 12 in order to select an item from the list L. Specifically, when the user rotates the first stick body 12, as illustrated in FIG. 6, an indicator also moves in the rotating direction, and thus the user can select an item from the list L.

As illustrated in FIG. 7, when the user rotates the first stick body 12, "Paul Smith" is selected and an image IM corresponding to "Paul Smith" may be displayed on the touch screen 20.

Figure 8:
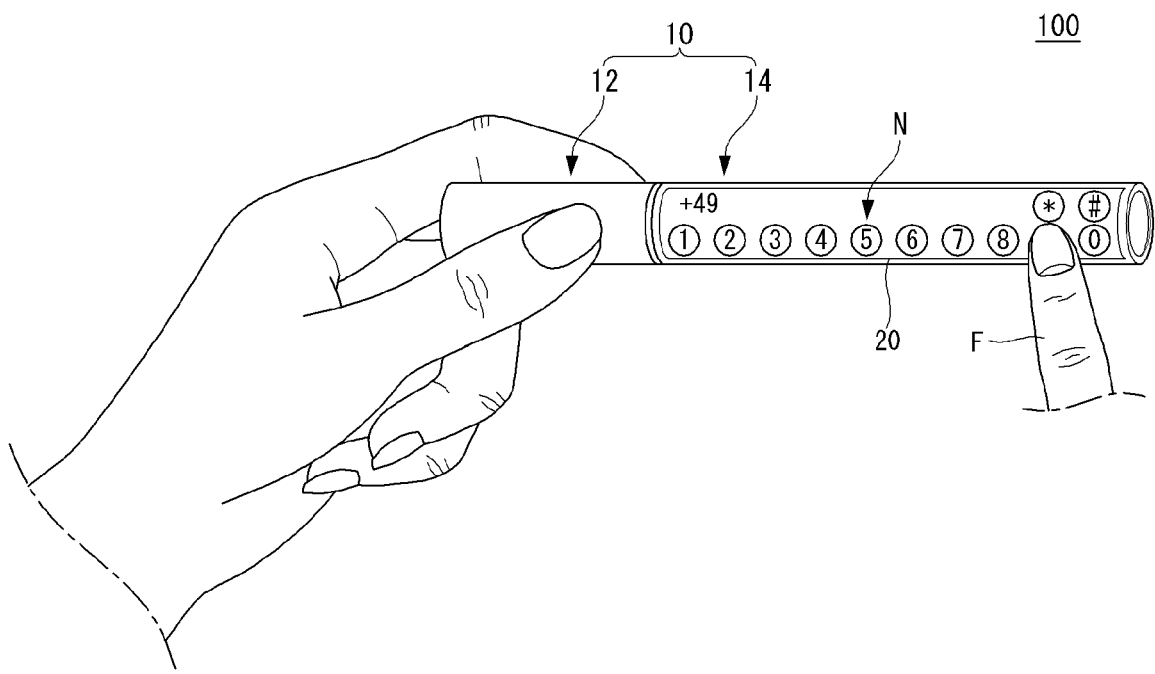
Figure 9:
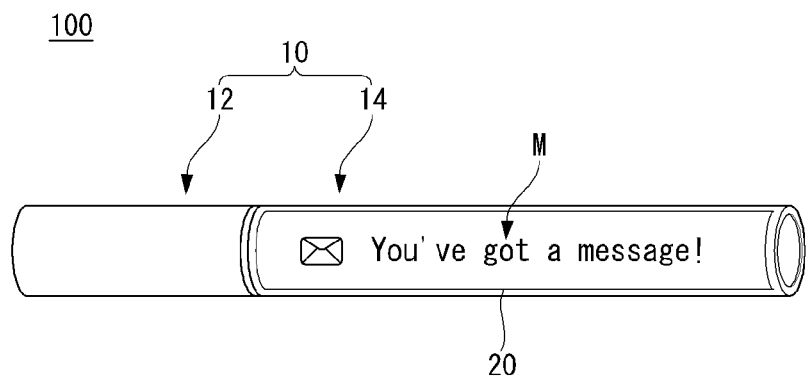

FIGS. 8 and 9 illustrate another operation of the mobile terminal 100 illustrated in FIG. 2. As illustrated in FIG. 8, the touch screen 20 may display an image representing a function of the mobile terminal 100. For example, the touch screen 20 may display input keys N for receiving an input. Accordingly, the user can select at least one of the input keys N with an input device, such as a finger.

The touch screen 20 may be provided on one or both of the first and second stick bodies 12 and 14. For example, the touch screen 20 can be placed on the external circumference of the first stick body 12, on the external circumference of the second stick body 14, or on both the external circumferences of the first and second stick bodies 12 and 14.

As illustrated in FIG. 9, the touch screen 20 of the mobile terminal 100 may display information M to the user. For example, the touch screen 20 can display the information M which informs the user that a message has been received.

Figure 10:
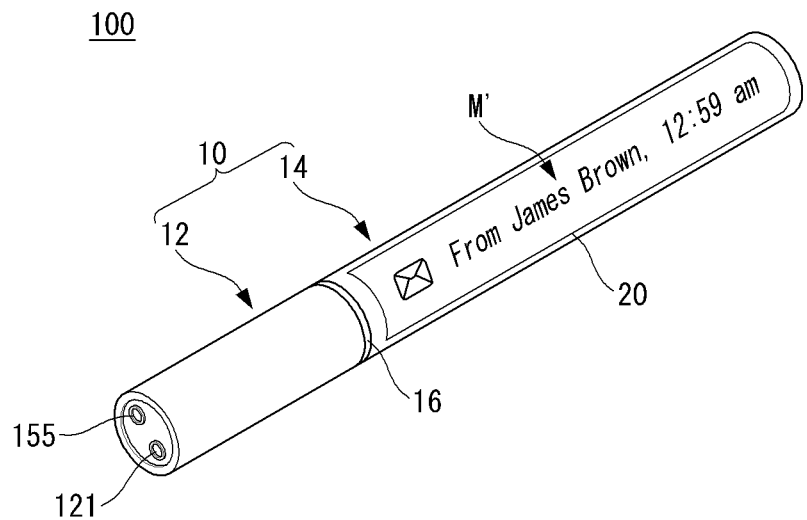
FIG. 10 illustrates a magnifying view of the mobile terminal according to an embodiment of the present invention.

FIG. 10 illustrates the mobile terminal 100 according to an embodiment of the present invention.

As illustrated in FIG. 10, the mobile terminal 100 may include the projector module 155 and the camera 121. The projector module 155 can project an image onto an external object. Specifically, the projector module 155 can display an image on the surface of the external object which enables the mobile terminal 100 to display information without being restricted by the size of the touch screen 20.

An image displayed via the projector module 155 may be different from an image M displayed on the touch screen 20. When the mobile terminal 100 receives a text message, for example, information, such as a sender or a receiving time, corresponding to the text message can be displayed on the touch screen 20 and the content of the text message can be displayed via the projector module 155. In this example, the user can view the information displayed on the touch screen 20 and selectively activate the projector module 155.

The projector module 155 may be provided on one end of the stick body 10. For example, the projector module 155 can be located on the end of the first stick body 12, as shown in FIG. 10.

The camera 121 can capture an image of an object. Additionally, the camera 121 may perform a detection operation whereby the camera 121 may detect a user's motion.

An image of a motion captured by the camera 121 may be transmitted to the controller 180. The controller 180 can analyze the captured image and activate a specific operation of the mobile terminal 100 associated with the captured image.

The camera 121 and the projector module 155 may be located on the same plane. According to one embodiment, the motion captured by the camera 121 may be a user's gesture made in response to an image projected by the projector module 155. Accordingly, in order to detect a user's gesture, in this example, the camera 121 is required to face the direction in which the projector module 155 projects an image in order to capture a user's gesture made in response to the projected image.

For example, the projector module 155 may project virtual keys and the user may move a finger to input a key. In this example, the camera 121 can capture the motion of a user's finger with respect to the virtual keys projected by the projector module 155.

Figure 11:
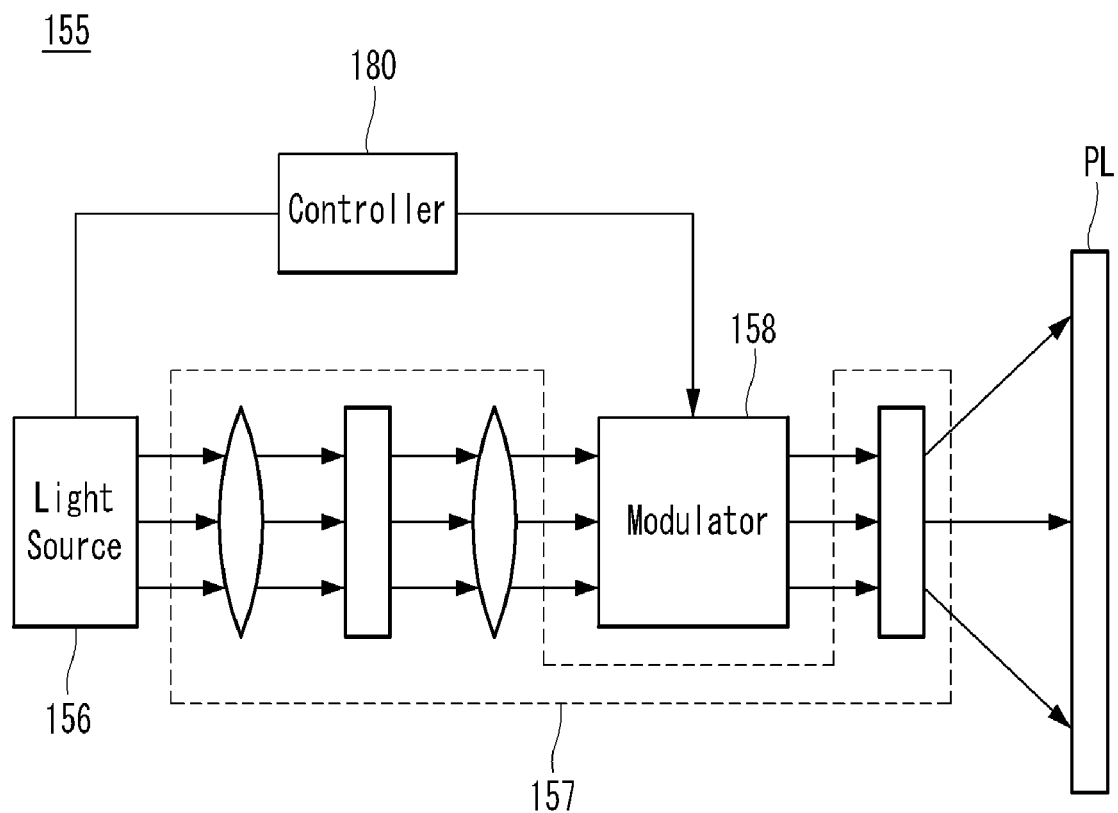
FIG. 11 is a block diagram of a projector module of the mobile terminal according to an embodiment of the present invention.

FIG. 11 is a block diagram of the projector module 155 of the mobile terminal 100 according to an embodiment of the present invention.

As illustrated in FIG. 11, the projector module 155 of the mobile terminal 100 may include a light source 156, an optical processor 157, and a modulator 158. The light source 156 can generate a Red (R), Green (G), or Blue (B) light or a combination of R, G, and B lights. The light source 156 may be a light emitting diode (LED) or a laser. The light emitted from the light source 156 may be transmitted to the optical processor 157.

The optical processor 157 may be an assembly of a single lens or multiple lenses. For example, the optical processor 157 may be a color combination system including a condenser lens and a dichroic mirror that only passes lights of a specific wavelength. The light emitted from the light source 156 can be shaped into a beam comprising a predetermined form while passing through the lenses. Specifically, the light emitted from the light source 156 radiates in a fan shape having the light source 156 as a starting point, the light can then be processed into a beam having a specific optic axis while passing through the optical processor 157. The optical processor 157 may be located in front of or behind the modulator 158.

The modulator 158 can form an image according to a control signal of the controller 180. The modulator 158 can adjust the brightness of light by adjusting a degree to which the modulator 158 transmits the light and a degree to which the modulator 158 reflects the light. In other words, RGB light has a specific shape when passing through the modulator 158. Accordingly, a recognizable shape is visible to the user from the light projected onto a surface PL when the light emitted from the light source 156 passes through the modulator 158 and the optical processor 157.

Figure 12:
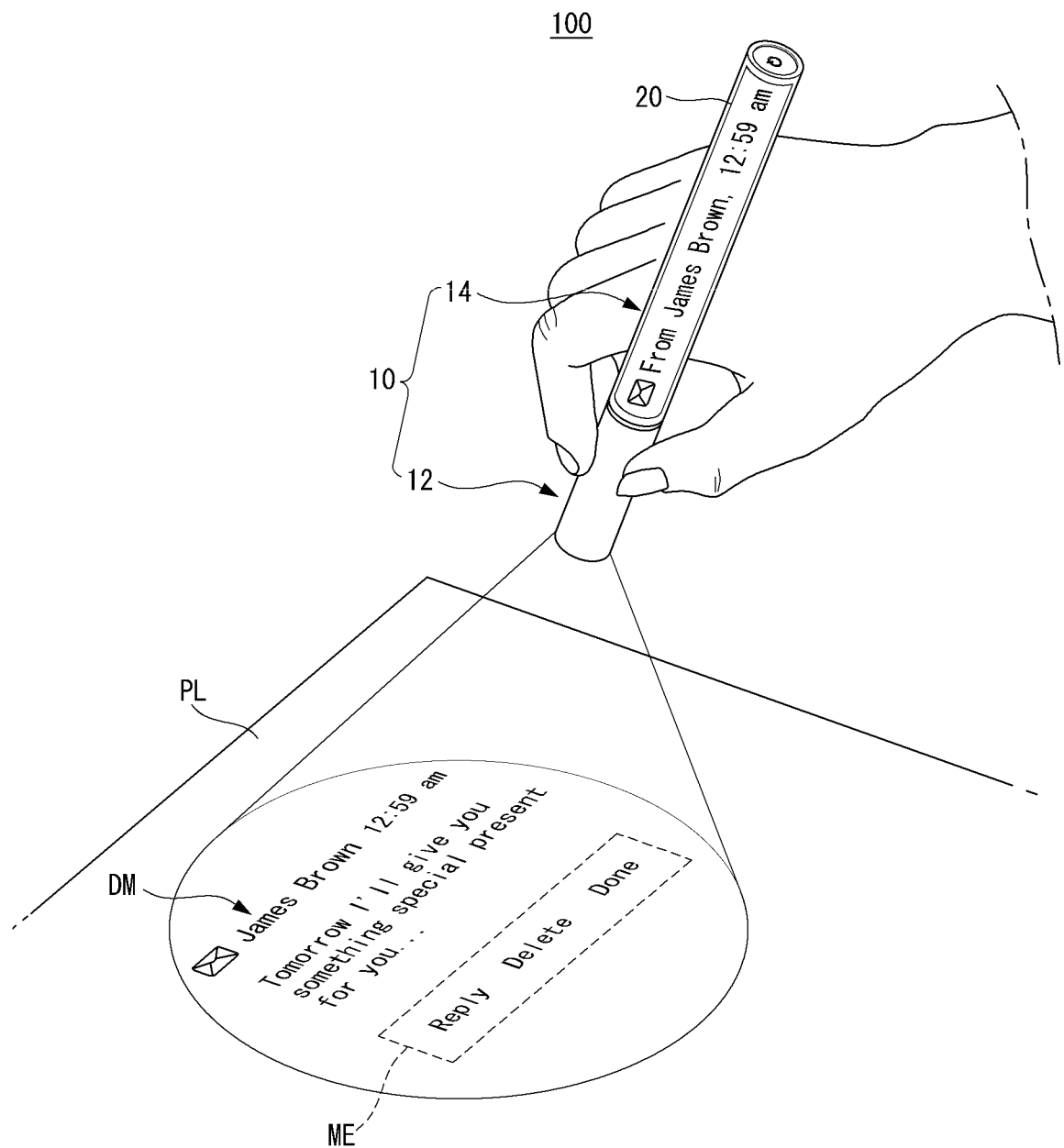
FIGS. 12 and 13 illustrate operations of the projector module according to various embodiments of the present invention.
Figure 13:
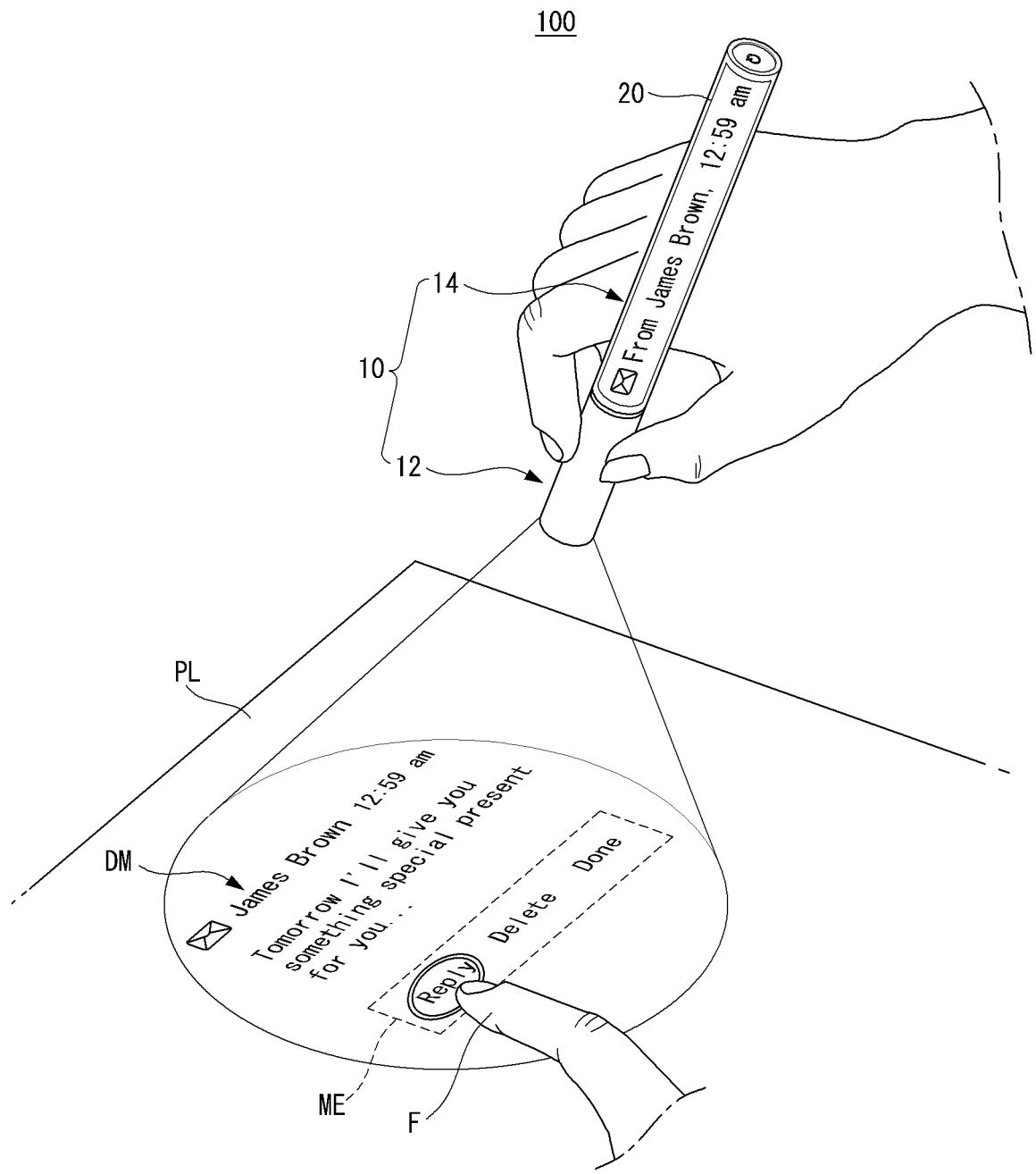

FIGS. 12 and 13 illustrate operations of the projector module 155 and the camera 121 according to an embodiment of the present invention.

As illustrated in FIG. 12, the user can project a received message DM onto the surface PL via the projector module 155. The controller 180 can change an image displayed on the touch screen 20 in comparison to the image projected onto the surface PL. For example, the touch screen 20 can display information regarding the content projected on the surface PL while the projector module 155 projects the full content on the surface 155.

As illustrated in FIG. 13, the user can select a menu ME with a finger F. When the user makes the gesture to select the menu ME, the controller 180 can analyze both the projected image and the user's gesture captured by the camera 121. Specifically, the controller 180 can analyze the image captured by the camera 121, determine a location of the user's gesture and determine the function corresponding to the location of the user's gesture. For example, if the user makes a gesture of touching the "replay" icon on the menu ME, as illustrated in FIG. 13, the camera 121 captures the user's gesture and transmits the captured image to the controller 180. The controller 180 can then analyze the user's gesture from the captured image and determine that the user selected a specific item from the menu ME. The controller 180 can display an indicator that visually indicates the touched point and may then execute a function corresponding to the input.

FIGS. 14-17 illustrate an operation of the mobile terminal 100 according to various embodiments of the present invention.

The mobile terminal 100 can sense a variation in the position of the mobile terminal 100 and recognize the position variation as characters. Furthermore, the mobile terminal 100 can display the recognized characters on the touch screen 20.

Figure 14:
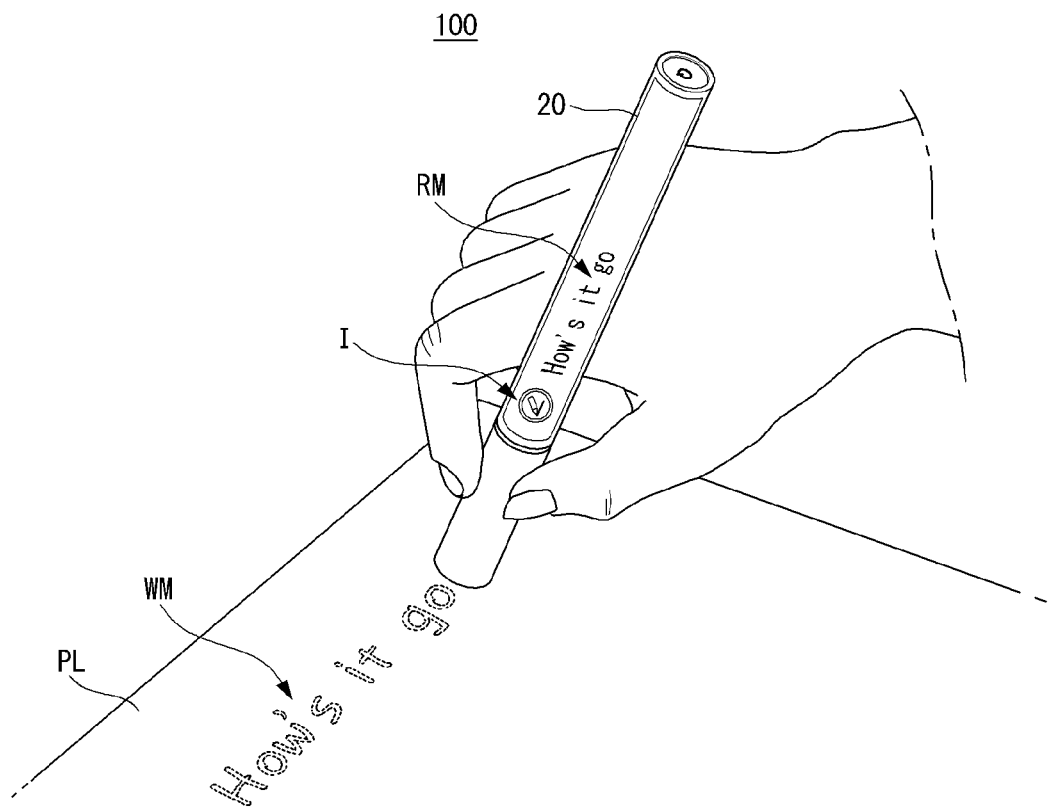
FIGS. 14 to 17 illustrate an operation of the mobile terminal according to various embodiments of the present invention.

As illustrated in FIG. 14, the user can hold the mobile terminal 100 and make a gesture similar to handwriting via the mobile terminal 100. For example, the user may hold the mobile terminal 100 and make a motion to simulate writing "How's it go" on the surface PL. The user's writing motion WM can be sensed by the motion sensor module 141 included in the mobile terminal 100. The motion sensor module 141 can sense a gesture of the mobile terminal 100 in a 2-dimensional or 3-dimensional space.

When the user's writing motion WM is sensed by the motion sensor module 141, the controller 180 can recognize the characters corresponding to the writing motion WM and use the recognized characters as an input value for a specific application. For example, when the mobile terminal 100 executes a SMS application, the controller 180 can transmit the recognized characters as a SMS message. Furthermore, the controller 180 can display the characters corresponding to the writing motion WM on the touch screen 20. The touch screen 20 may display an icon I indicating a writing gesture input mode in addition to the message RM corresponding to the recognized characters.

Figure 15:
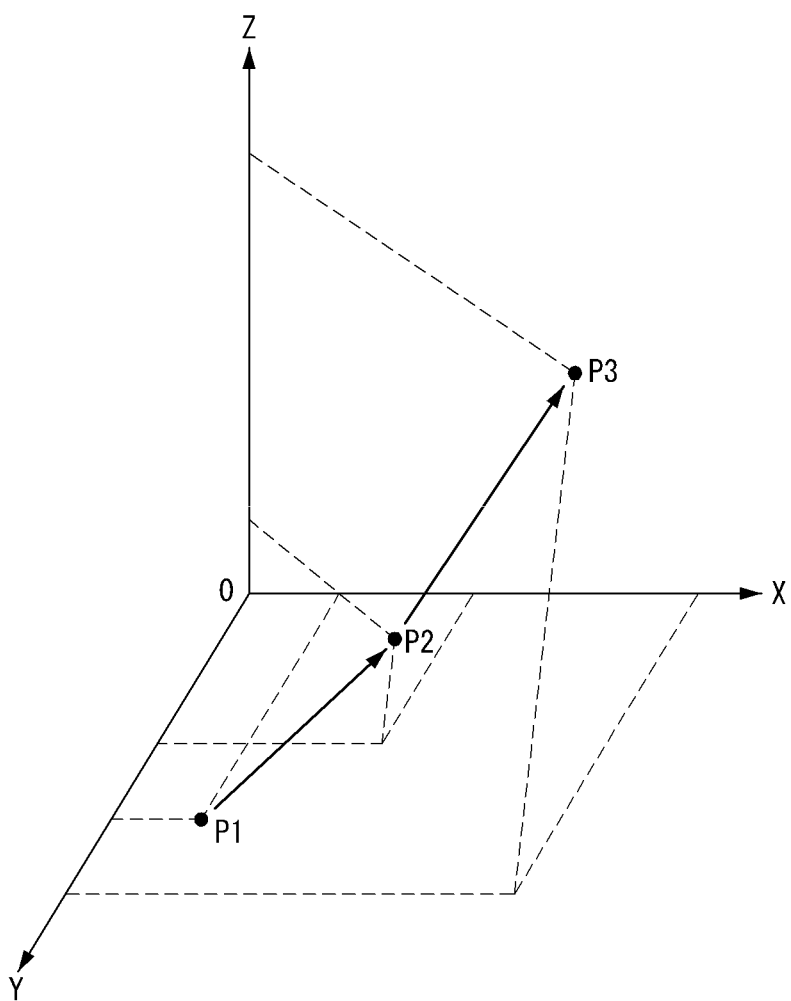

As illustrated in FIG. 15, the user can move in the 3-dimensional space holding the mobile terminal 100. That is, the user can move from a first point P1, to a second point P2, and finally to a third point P3. The movement between the first and second points P1 and P2 and the movement between the second point P2 and third point P3 may have different angles and accelerations. The motion sensor module 141 can sense a user's gesture by sensing a variation between the angles and accelerations.

Figure 16:
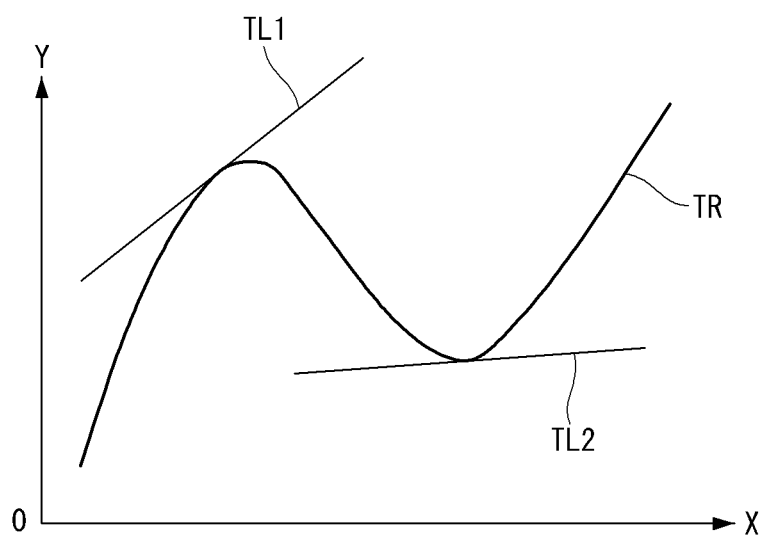

As illustrated in FIG. 16, the movement of the mobile terminal 100 may be traced via a trace route TR. The trace route TR represents a moving route of the mobile terminal 100 to express a specific character. The controller 180 can determine a variation in the trace route TR of the mobile terminal 100 in view of gradients TL1 and TL2 of the trace route TR. Accordingly, the controller 180 can recognize characters expressed via the mobile terminal 100 by monitoring the variations in the trace route TR.

Figure 17:
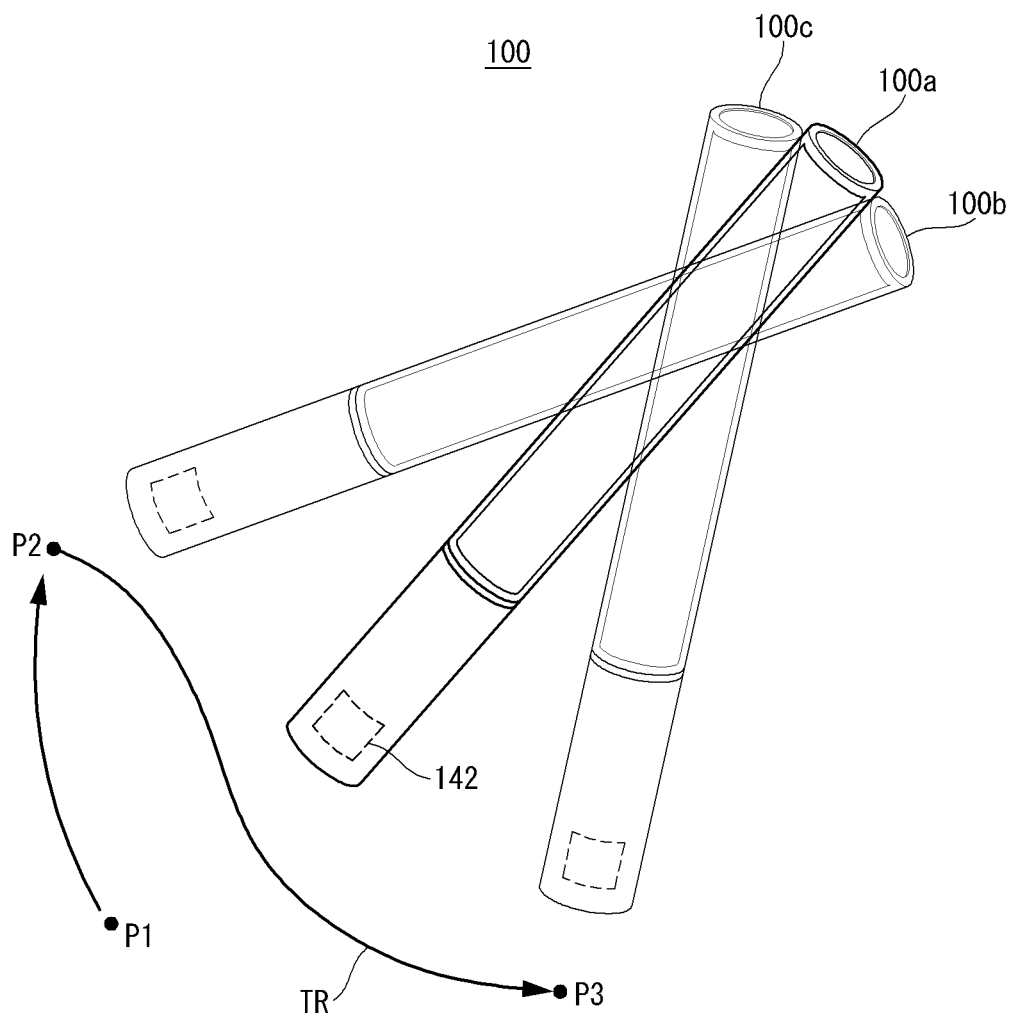

As illustrated in FIG. 17, the mobile terminal may be moved to various points on a plane. For example, the first point P1, second point P2, and third point P3 may, respectively, correspond to different positions 100a-100c of the mobile terminal 100. In this example, the user may hold an upper portion of the mobile terminal 100 when moving the mobile terminal 100. Accordingly, a user's gesture made with the mobile terminal 100 may be sensed when the motion sensor module 141 is located opposite to the upper portion of the mobile terminal 100. However, the position of the motion sensor module 141 and the number of motion sensor modules 141 are not limited to the examples described above.

Figure 18:
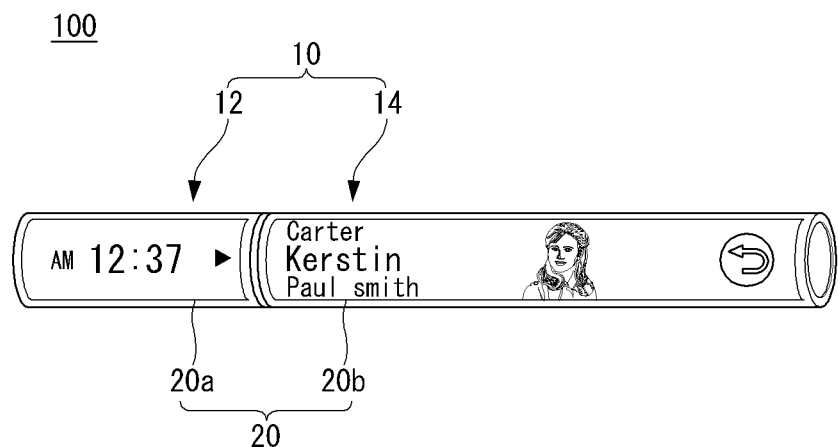
FIGS. 18 to 21 illustrate a mobile terminal according to various embodiments of the present invention.

FIG. 18 illustrates an implementation of the mobile terminal 100 according to an embodiment of the present invention.

As illustrated in FIG. 18, the mobile terminal 100 may include the first and second stick bodies 12 and 14, respectively, comprising the touch screen 20. Specifically, the first stick body 12 may include a first display 20a and the second stick body 14 may include a second display 20b.

Figure 19:
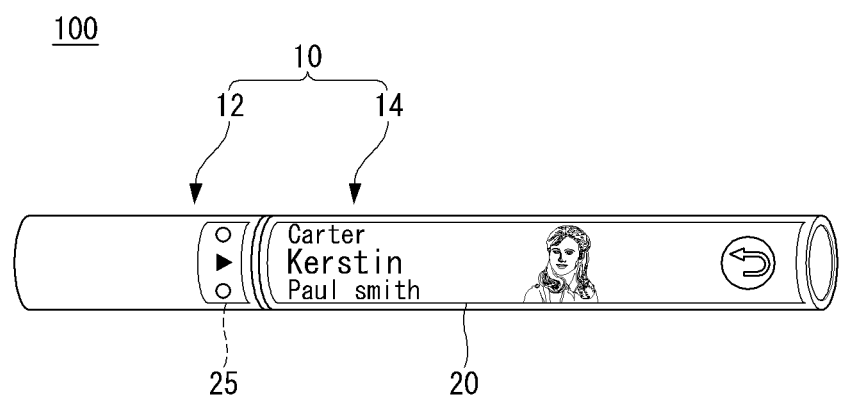

FIG. 19 illustrates an implementation of the mobile terminal 100 according to an embodiment of the present invention.

As illustrated in FIG. 19, the mobile terminal 100 may include a light-emitting part 25 provided to the first stick body 12. The light-emitting part 25 may emit light according to the operating state of the first stick body 12. For example, the light-emitting part 25 can include an arrow luminous body placed at the center thereof to indicate a currently selected item and luminous bodies arranged on both sides of the arrow to indicate a current rotating direction.

Figure 20:
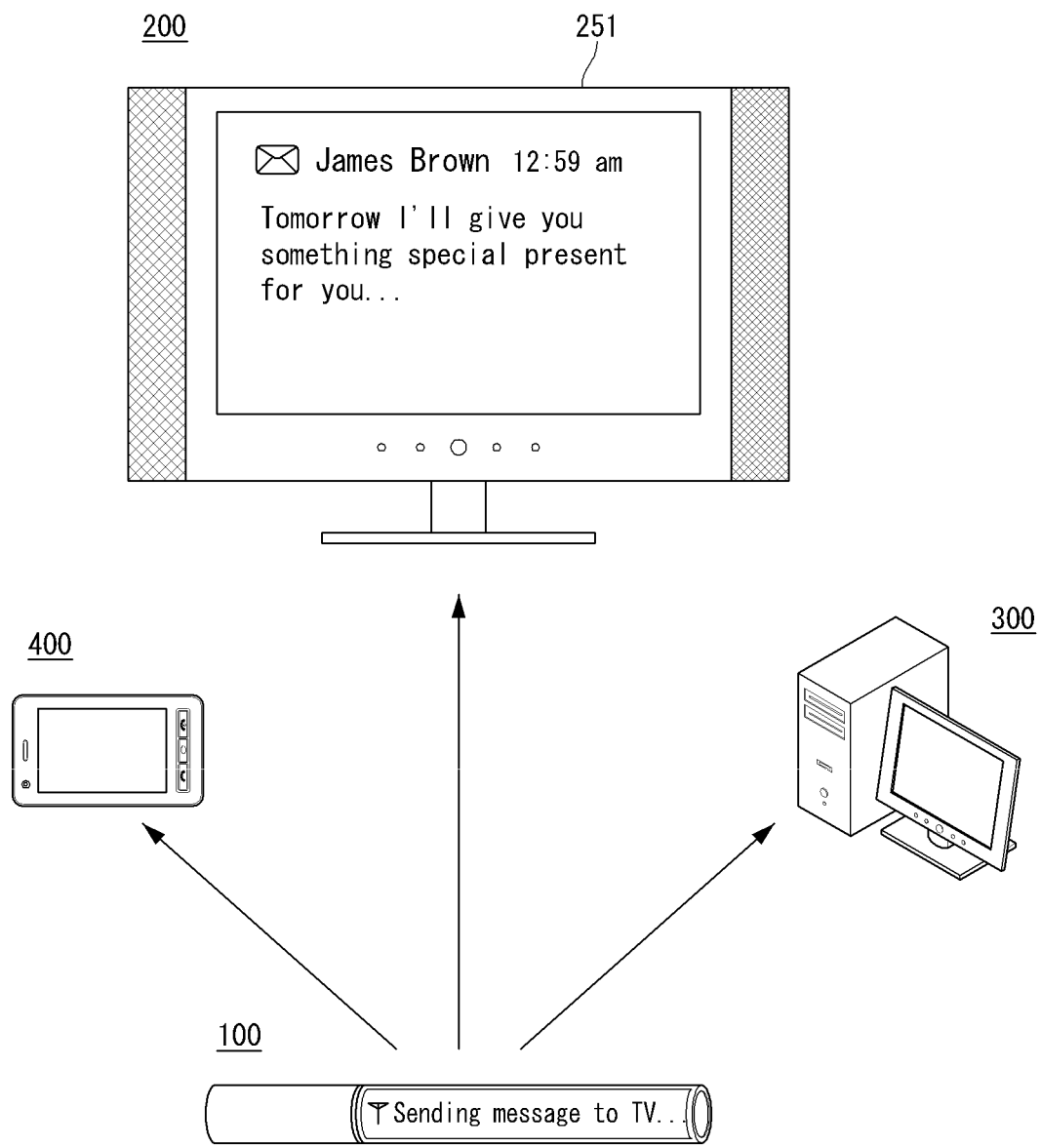

FIG. 20 illustrates an implementation of the mobile terminal 100 according to an embodiment of the present invention.

As illustrated in FIG. 20, the mobile terminal 100 may transmit content to other electronic devices 200, 300, and 400. For example, the mobile terminal 100 can transmit a received message to a display 251 of the TV system 200. Here, the electronic devices 200, 300, and 400 may be automatically selected according to their location or distance from the mobile terminal 100, additionally the electronic devices 200, 300, and 400 may be selected by the user.

Figure 21:
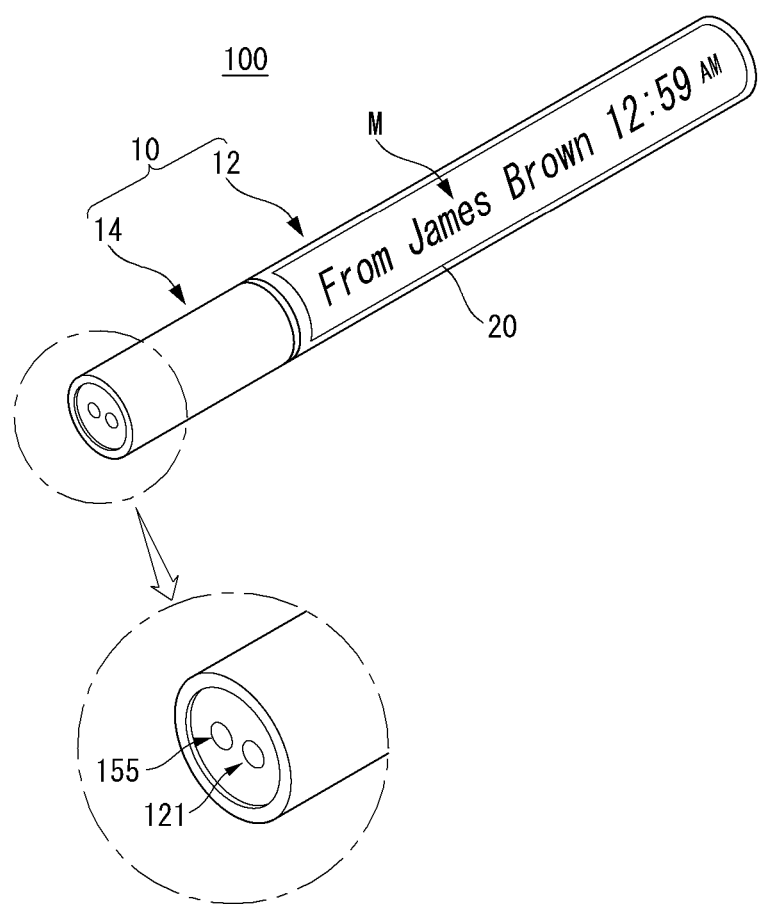

FIG. 21 illustrates an implementation of the mobile terminal 100 according to an embodiment of the present invention. As illustrated in FIG. 21, the mobile terminal 100 may include the projector module 155 and the camera 121. The projector module 155 can project an image such that an image displayed via the projector module 155 may be different from an image M displayed on the touch screen 20.

For example, when the mobile terminal 100 receives a text message, information associated with the text message, such as a sender or a receiving time, can be displayed on the touch screen 20 and the content of the text message can be displayed via the projector module 155. In this example, the user can see the information displayed on the touch screen 20 and may selectively activate the projector module 155 to read the content of the text message.

The projector module 155 may be provided on one end of the stick body 10. For example, the projector module 155 can be located on the end of the second stick body 14, as shown in FIG. 21. The camera 121 can capture an image of an external object. Specifically, the camera 121 can photograph a gesture of the user, in other words, the camera 121 can be considered a gesture sensor.

A gesture image captured by the camera 121 may be transmitted to the controller 180. The controller 180 can analyze the gesture image and activate or inactivate a specific function of the mobile terminal 100 if the gesture corresponding to the gesture image relates to the specific function.

The camera 121 and the projector module 155 may be located on the same plane. Since the projector module 155 is placed on one end of the stick body 10 of the mobile terminal 100, the camera 121 may also be located on the end of the stick body 10. A gesture captured by the camera 121 may be a user's gesture made in response to an image projected by the projector module 155. Accordingly, the camera 121 should face the direction in which the projector module 155 projects an image in order to capture a user's gesture on the projected image.

For example, the projector module 155 may project virtual keys and the user may move a finger on the virtual keys to input a key. Here, the camera 121 can capture the user's finger motion with respect to the virtual keys projected by the projector module 155 because the camera 121 and the projector module 155 are located in the same direction.

Figure 22:
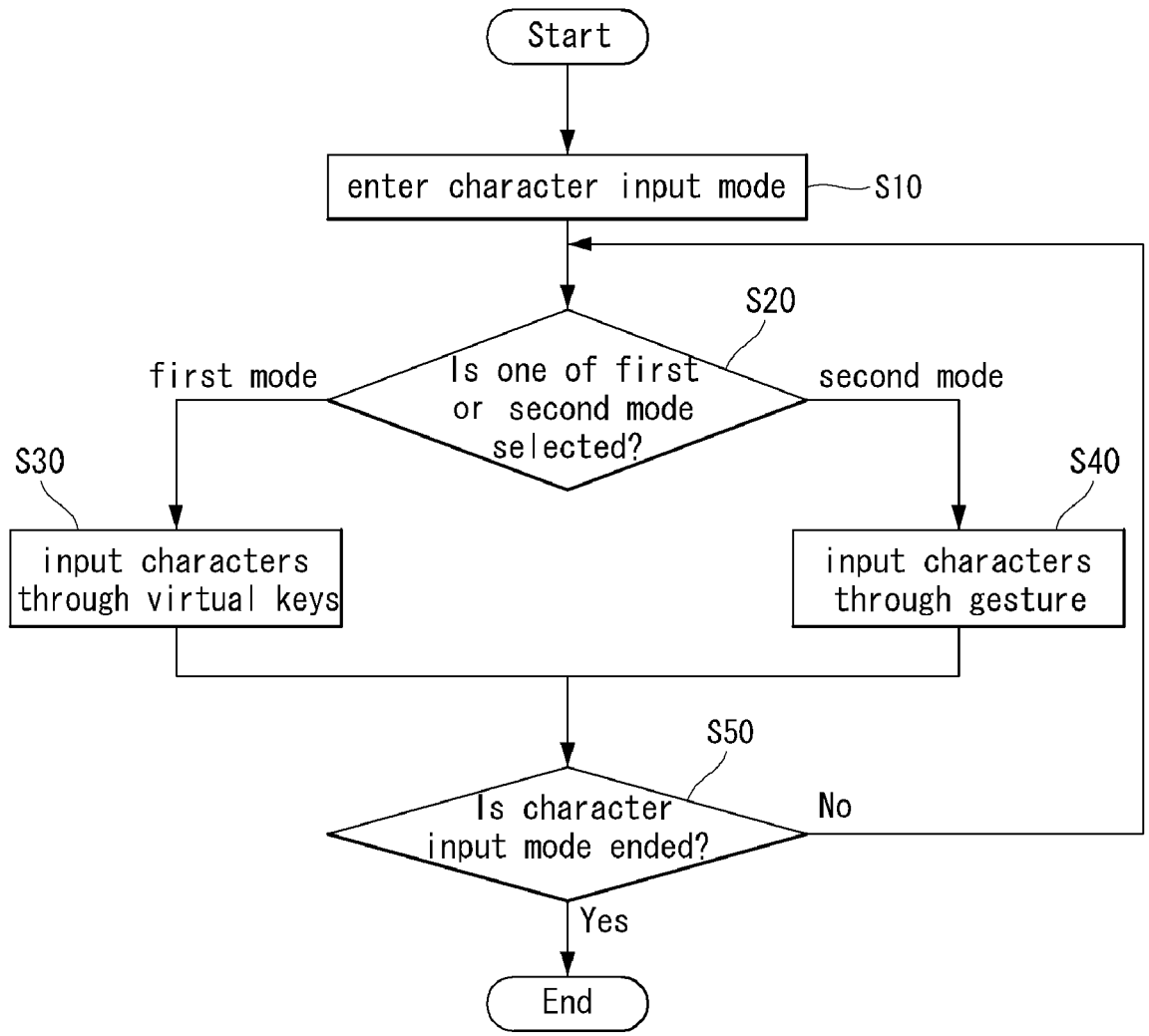
FIG. 22 is a flowchart illustrating an operation of the mobile terminal according to an embodiment of the present invention.

FIG. 22 is a flowchart illustrating an operation of the mobile terminal 100 according to an embodiment of the present invention.

As illustrated in FIG. 22, the controller 180 of the mobile terminal 100 can control the mobile terminal 100 to enter the character input mode (S10). The character input mode refers to a mode in which the user can input characters to the mobile terminal. The character input mode may be initiated when a function for requesting the input of characters is executed.

Specifically, the user can input characters to create a message, email, or the like. Additionally, for example, the mobile terminal 100 can enter the character input mode when the user selects a "respond" button after receiving a message. Characters that can be input in the character input mode may include letters, signs, formulas, and the like.

When the mobile terminal 100 enters the character input mode, the controller 180 can select one of a first character input mode or a second character input mode (S20) and input characters in the selected character input mode (S30, S40).

The first or second character input modes may be selected by the user or may be executed the controller 180.

In the former example, the user can select one of the first or second character input modes via a menu. In the latter example, one of the first and second character input modes can be selected by the controller 180 according to a state of the mobile terminal 100.

The user can input characters via virtual keys VK, displayed by the projector module 155, (FIG. 24) in the first character input mode (S30). Specifically, the controller 180 can operate the projector module 155 to display the virtual keys VK when the first character input mode is activated. The user can touch the virtual keys VK in order to input characters. Specifically, when the user input a displayed virtual key, the camera 121 photographs the user's touch and the controller 180 recognizes the key selected by the user from the image captured by the camera.

The user can input characters via a writing gesture in the second character input mode. Specifically, when the user makes a gesture of drawing a letter on a virtual plane with an object, such as a finger, the camera 121 photographs the user's writing gesture and the controller 180 recognizes the letter input by the user from the image photographed by the camera.

The controller 180 determines whether the character input mode has terminated (S50) and allows the user to continue inputting characters in the character input mode when the character input mode has not been terminated.

Figure 23:
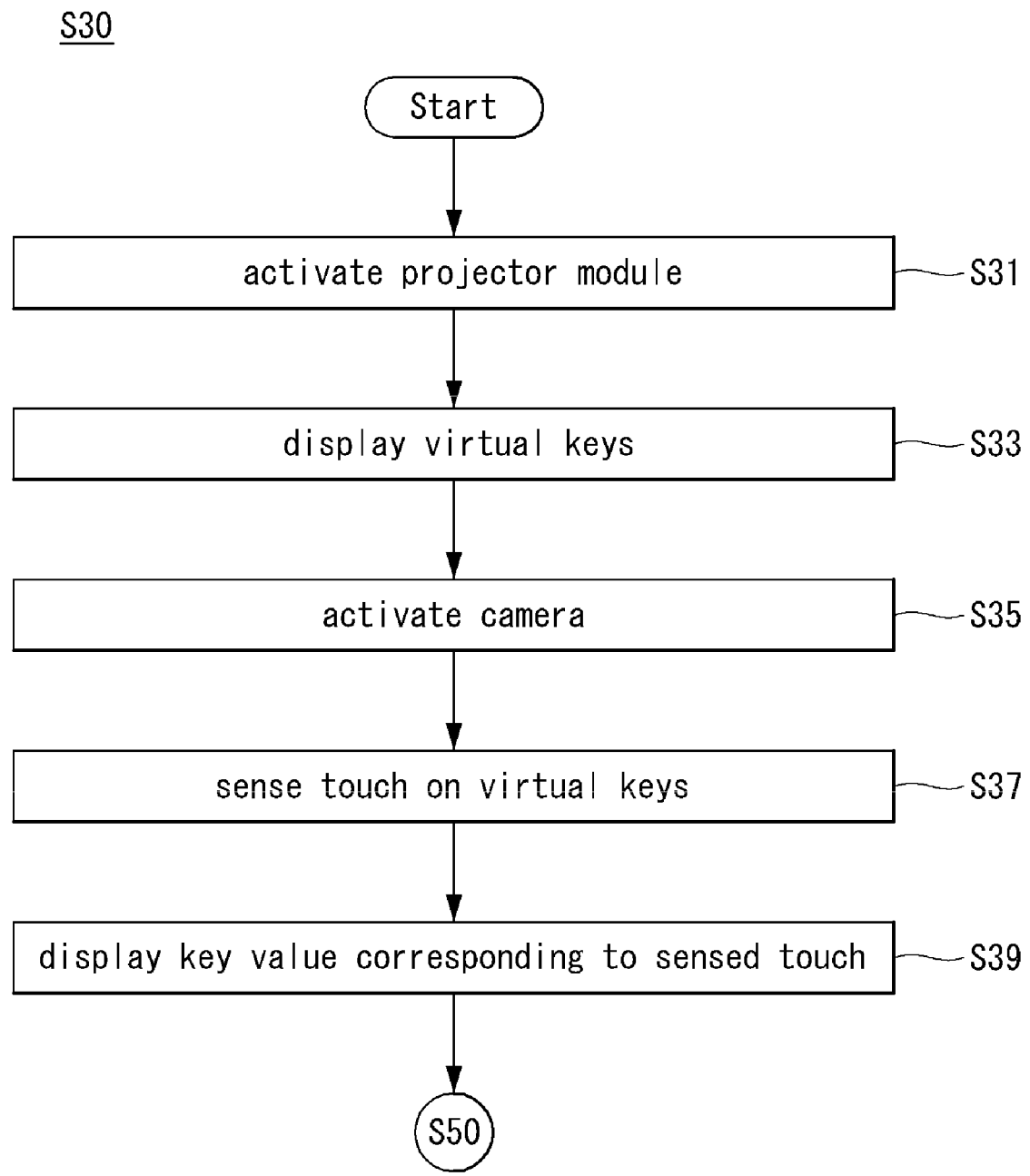
FIG. 23 is a flowchart illustrating an operation for inputting characters via virtual keys according to an embodiment of the present invention.
Figure 24:
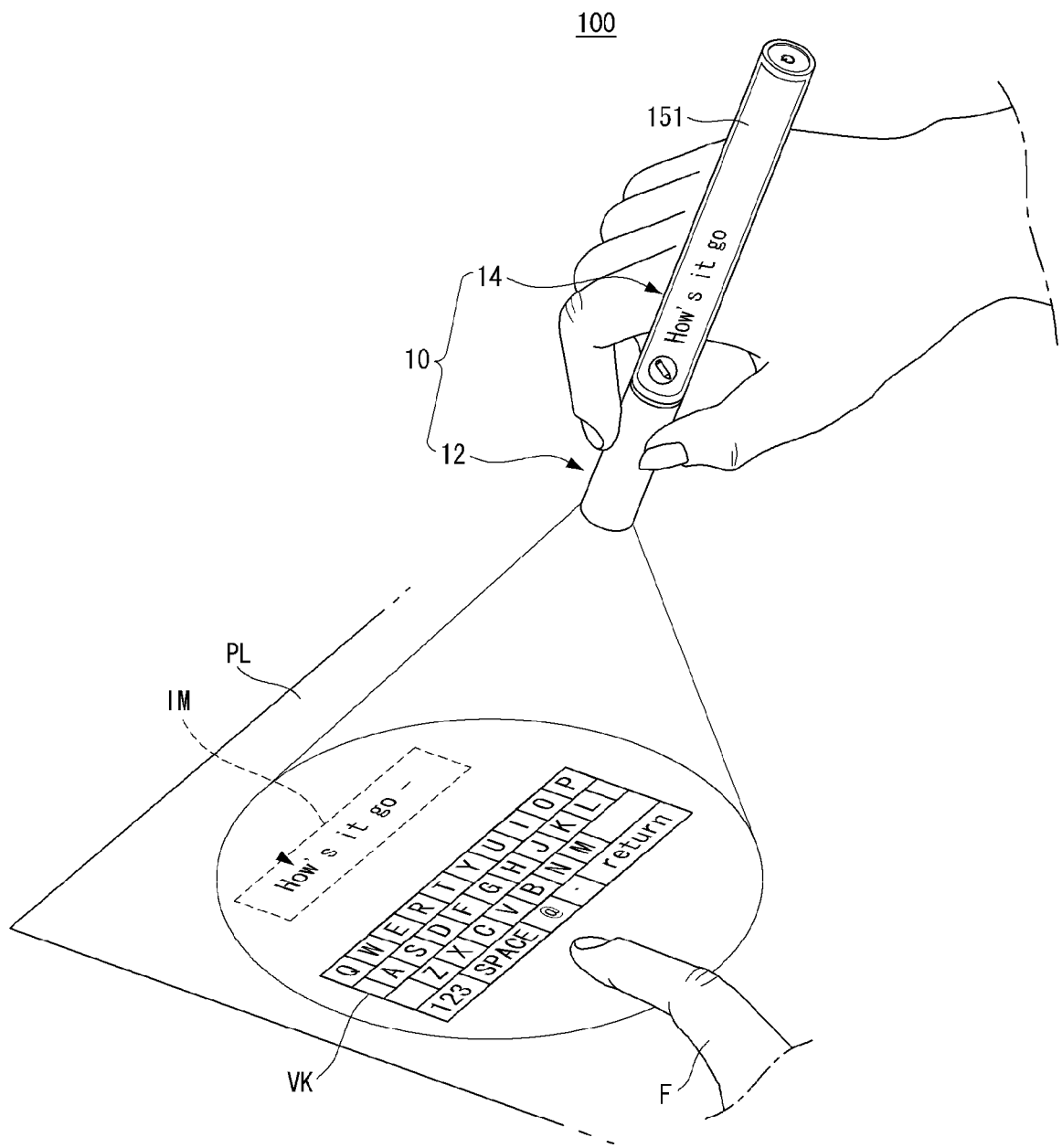
FIG. 24 illustrates the operation of inputting characters via virtual keys according to an embodiment of the present invention.

FIG. 23 is a flowchart of the operation S30 of inputting characters via the virtual keys as illustrated in FIG. 22. FIG. 24 illustrates an operation of inputting characters via the virtual keys according to an embodiment of the present invention.

As illustrated in FIG. 23 the operation for inputting characters via the virtual keys may begin by activating the projector module 155 (S31).

When the projector module 155 is activated, the mobile terminal 100 can project an image on the surface PL. The controller 180 selectively activates the projector module 155 when the mobile terminal 100 is in a specific state.

The virtual keys VK may be displayed (S33) when the projector module 155 is activated. The virtual keys VK can be displayed on the surface PL via the projector module 155 (FIG. 24). Additionally, the virtual keys VK may be displayed as a QWERY keyboard (FIG. 23).

Furthermore, the camera 121 may be activated (S35) when the virtual keys VK are displayed. The activated camera 121 can photograph a user's touch input on the virtual keys VK. The controller 180 selectively activates the camera 121 when the mobile terminal 100 is in a specific state.

Additionally, a user's touch applied to the virtual keys VK may be sensed (S37), via the camera 121, when the virtual keys VK are displayed by the projector module 155. In other words, a user's input from an input device, such as a finger F, may be photographed by the camera (FIG. 23, photography not shown).

As illustrated in FIG. 24, when the touch of the virtual keys VK is sensed, a key value IM corresponding to the touch may be displayed (S39).

The controller 180 can analyze the user's touch on the virtual keys VK to recognize the part of the virtual keys VK touched by the user. When the controller 180 recognizes the touched part of the virtual keys VK, the controller 180 can display, via the projector module 155, the key value IM corresponding to the touched part of the virtual keys VK. Accordingly, the user can immediately confirm whether the characters have been input as intended. Furthermore, the key value IM input by the user can be displayed on the touch screen 20 provided to the stick body 10.

Figure 25:
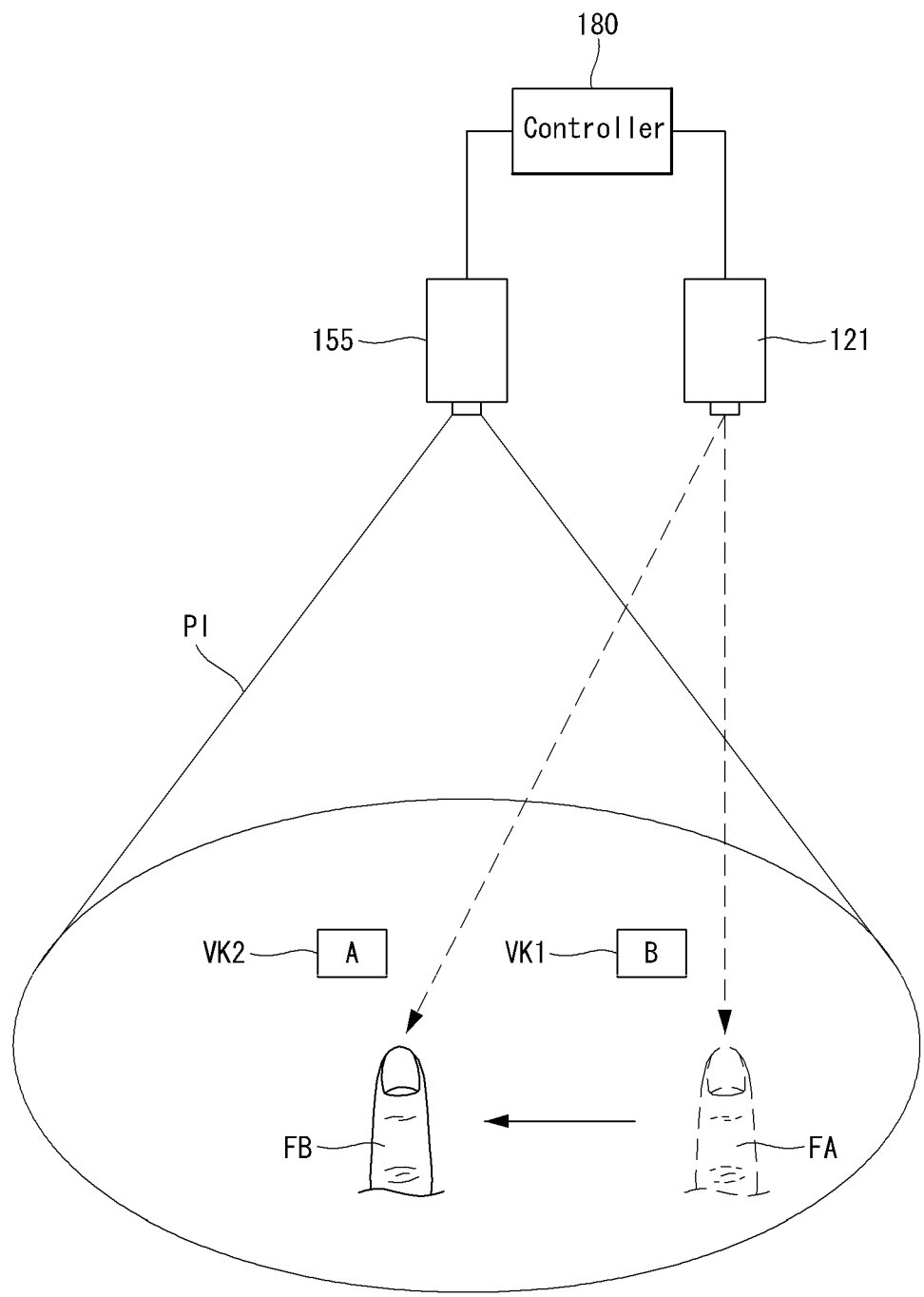
FIGS. 25 and 26 illustrate an operation of capturing a gesture input via a camera according to various embodiments of the present invention.
Figure 26:
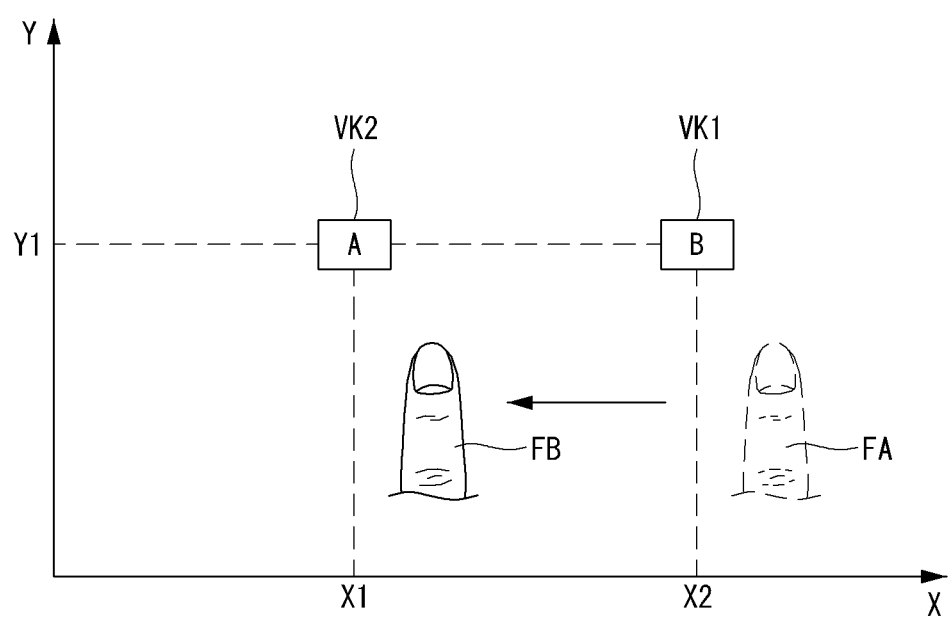

FIGS. 25 and 26 illustrate an operation of photographing a gesture input via the camera 121.

As illustrated in FIG. 25, the controller 180 can control the projector module 155 and the camera 121. The projector module 155 can project an image PI in response to a control signal of the controller 180. The projected image PI may include first and second virtual keys VK1 and VK2.

The user can move an input device, such as a finger, from a first point FA to a second point FB. The user's movement of the finger can be photographed by the camera 121. The controller 180 can analyze the image of the gesture, captured by the camera 121, to determine which of the first and second virtual keys VK1 and VK2 were touched by the user.

As illustrated in FIG. 26, even if the user moves an input device in the 3-dimensional space, this motion can be analyzed as a motion on the 2-dimensional plane. That is, a 3D image captured by the camera 121 can be converted to a 2D image on the XY plane. The controller 180 can determine the point of the user's input in consideration of the 2D image and the first and second virtual keys VK1 and VK2.

Figure 27:
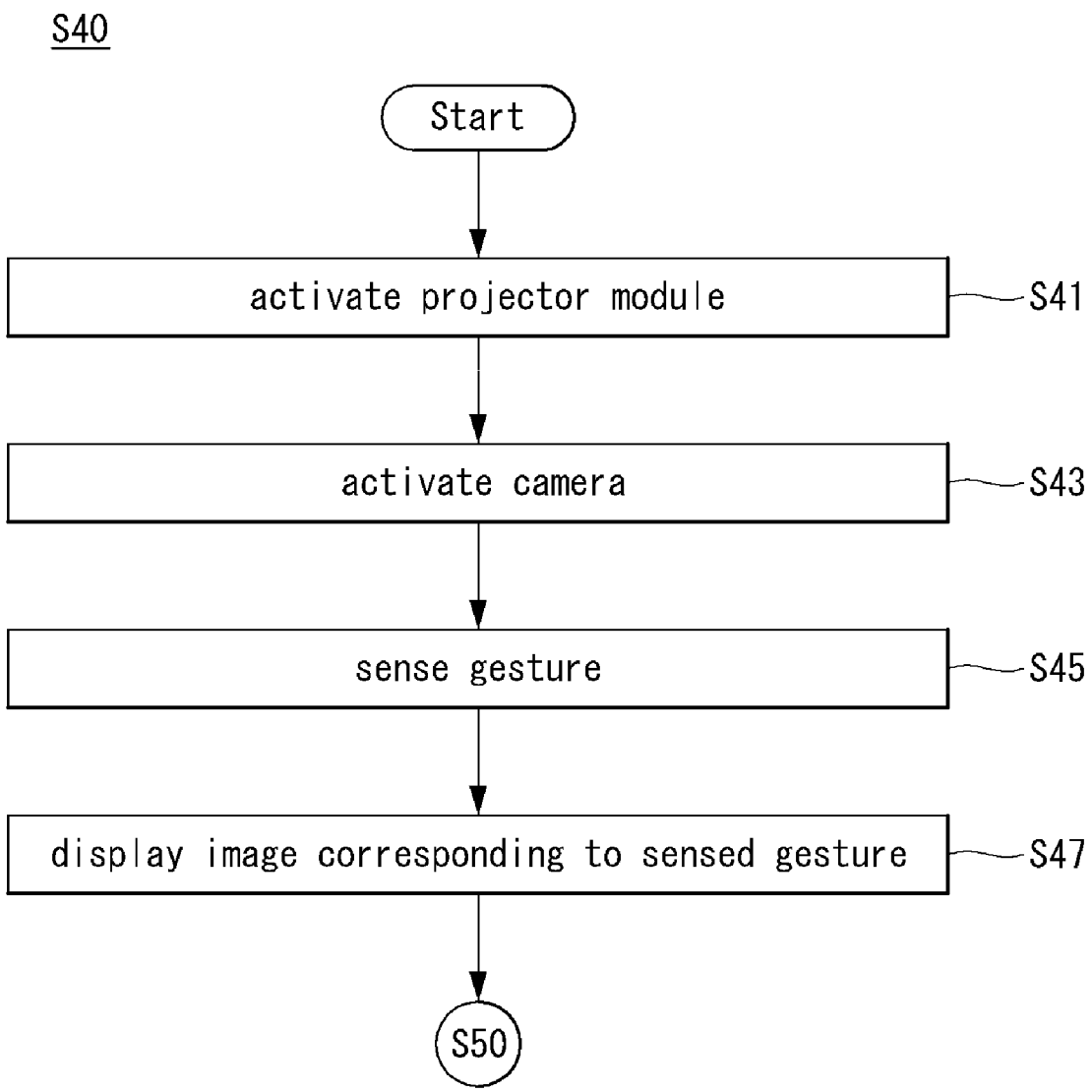
FIG. 27 is a flowchart illustrating an operation for inputting characters via a gesture according to an embodiment of the present invention.
Figure 28:
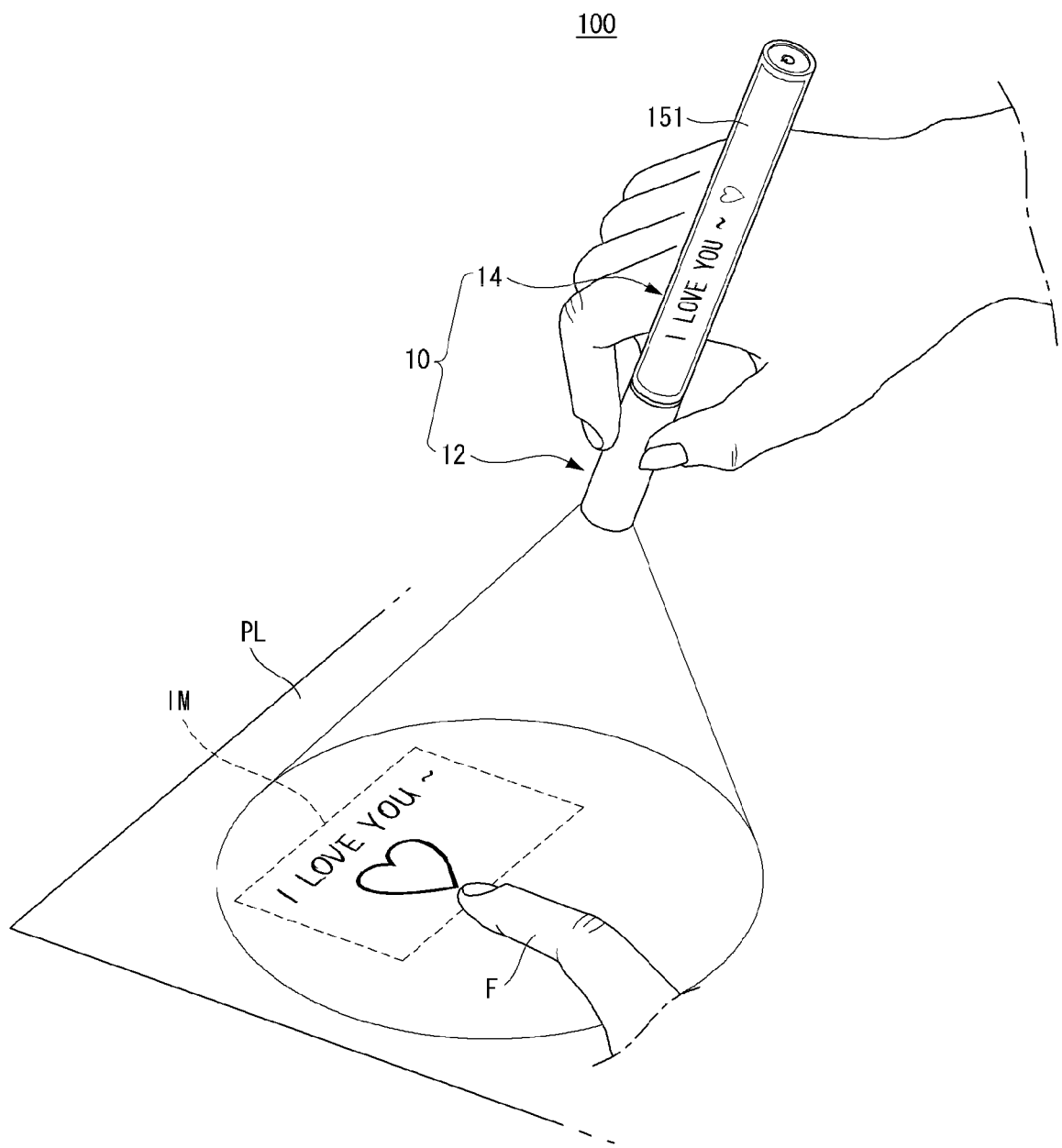
FIG. 28 illustrates the operation of inputting characters via a gesture according to an embodiment of the present invention.

FIG. 27 is a flowchart illustrating the step S40 for inputting characters via a gesture as illustrated in FIG. 22. FIG. 28 illustrates a method for inputting characters via a gesture.

As illustrated in FIG. 27, the step S40 may be initialized by the activation of the projector module 155 (S41). The camera 121 can be activated (S43) when the projector module 155 is activated.

When the camera 121 is activated, a user's gesture may be sensed (S45). For example, the user's gesture may be a writing gesture (FIG. 28). Specifically, the user's gesture may be a gesture of moving the finger F to draw a character (FIG. 28). The camera 121 captures an image of the user's gesture and the controller 180 analyzes the captured image to recognize the character input by the user.

An image corresponding to the captured gesture may be displayed after capturing the user's gesture (S47, FIG. 27). As illustrated in FIG. 28, the image corresponding to the captured gesture may be expressed along the trace of the user's writing gesture. Furthermore, the user input may be displayed on the touch screen 20 of the stick body 10 (FIG. 28).

Figure 29:
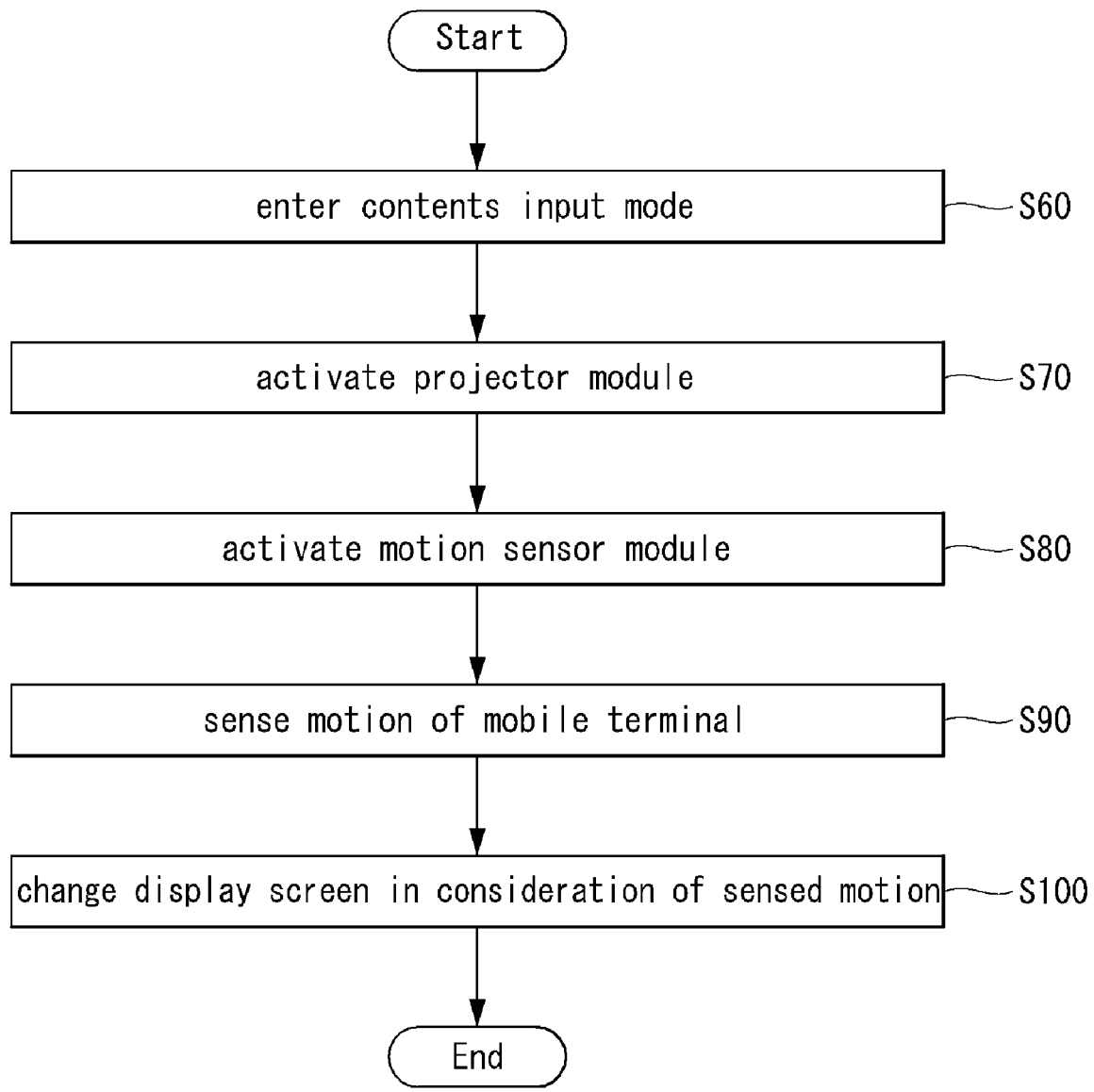
FIG. 29 is a flowchart illustrating an operation of the mobile terminal in a content display mode according to an embodiment of the present invention.
Figure 30:
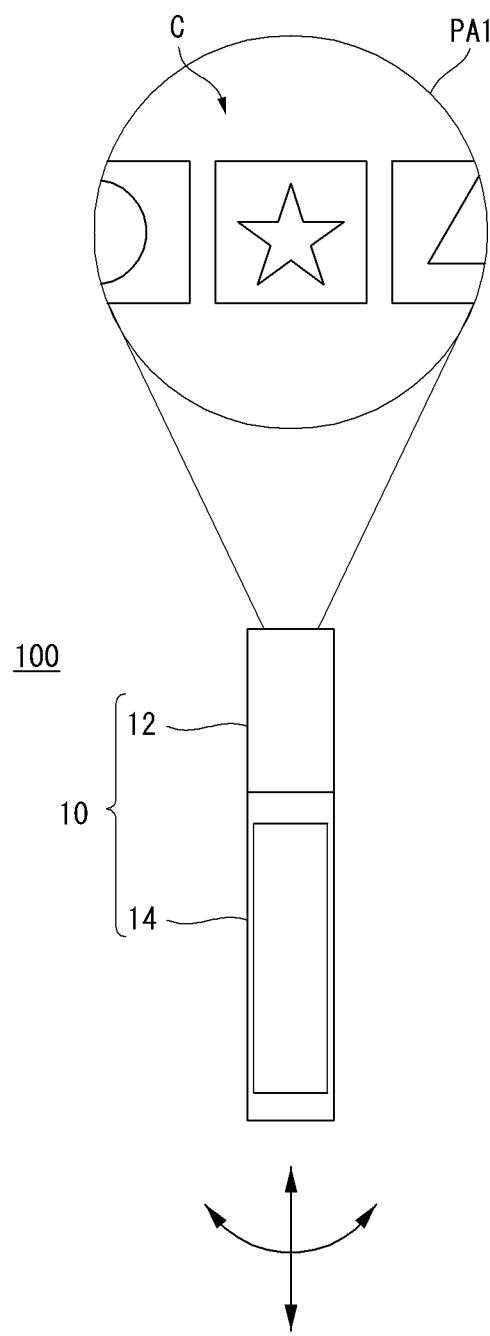
FIGS. 30 to 36 illustrate displayed content according to various embodiments of the present invention.
Figure 31:
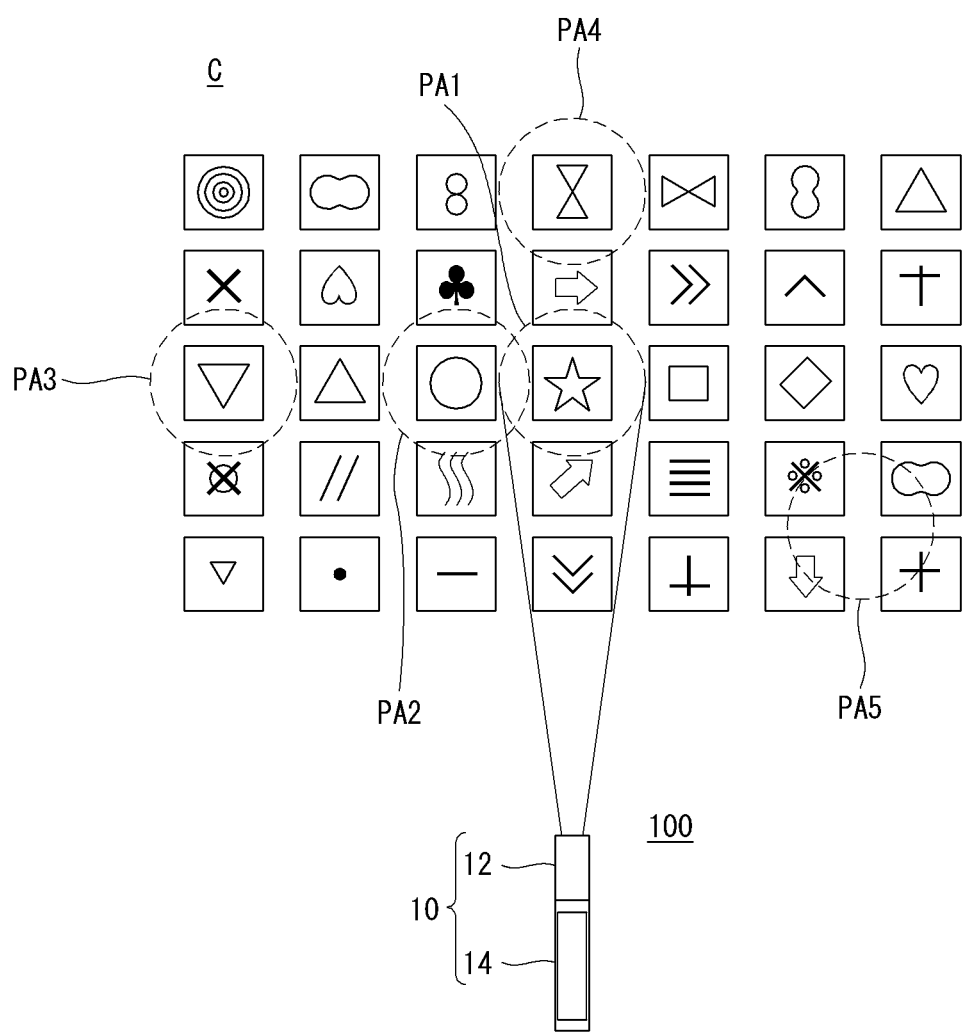

FIG. 29 is a flowchart illustrating an operation of the mobile terminal in a content display mode according to another embodiment of the present invention. FIGS. 30 and 31 illustrate examples of content displayed according to another embodiment of the present invention.

As illustrated in FIG. 29, the controller 180 of the mobile terminal 100 may control the mobile terminal 100 to enter the content display mode (S60). When the mobile terminal 100 enters the content display mode, the controller 180 may activate the projector module 155 (S70) and activate the motion sensor module 141 (S80).

The motion sensor module 141 can sense the trace and speed of the mobile terminal 100 moving in a 3D or 2D space. When the motion sensor module 141 is activated, the controller 180 can sense the motion of the mobile terminal 100 (S90) and change the display image of the mobile terminal 100 according to the sensed motion (S100).

The user may make a gesture with the mobile terminal 100 in order to change the displayed image. Accordingly, when a user's gesture is sensed by the motion sensor module 141, the controller 180 can change the image displayed by the projector module 155.

As illustrated in FIG. 31, content C may be displayed via the projector module 155 of the mobile terminal 100. In this example, the overall size of the content C may be larger than a displayed first area PA1. However, only the first area PA1 can be shown to the user due to restrictions on the displayable area of the projector module 155.

As illustrated in FIG. 31, the currently displayed first area PA1 may only partially display all of the content C. In this example, the user can move the stick body 10 from the current position to display a second area PA2. Furthermore, the user can further move the stick body 10 to the left to change the first area PA1 to a third area PA3. In addition, the rate at which a displayed image is changed may depend on the speed moving the stick body 10.

Figure 32:
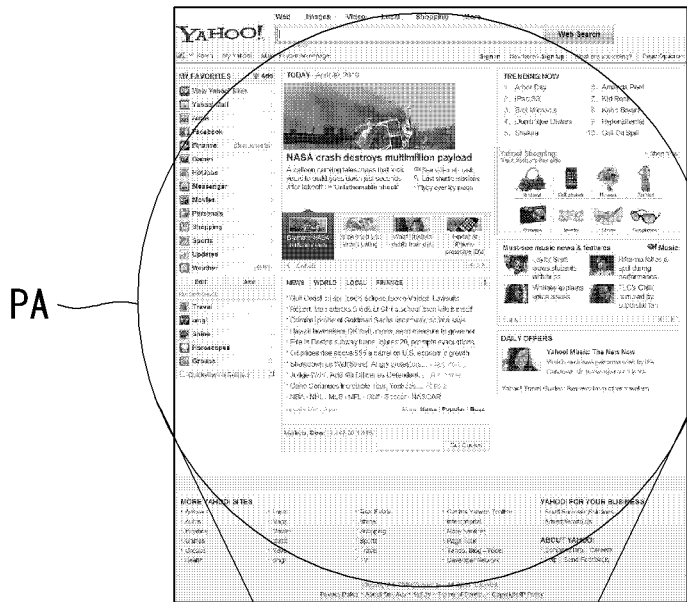
Figure 32:
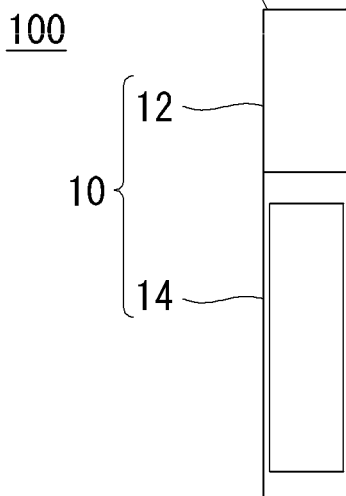

FIG. 32 illustrates another example of displaying content according to an embodiment of the present invention.

As illustrated in FIG. 32, the content may be a web page WP. The area of the web page WP may be larger than a display area PA. Accordingly, the controller 180 can display part of the web page WP based on the current position of the mobile terminal 100. Furthermore, the controller 180 can display an area above or below the current display area PA according to the movement of the mobile terminal 100.

Figure 33:
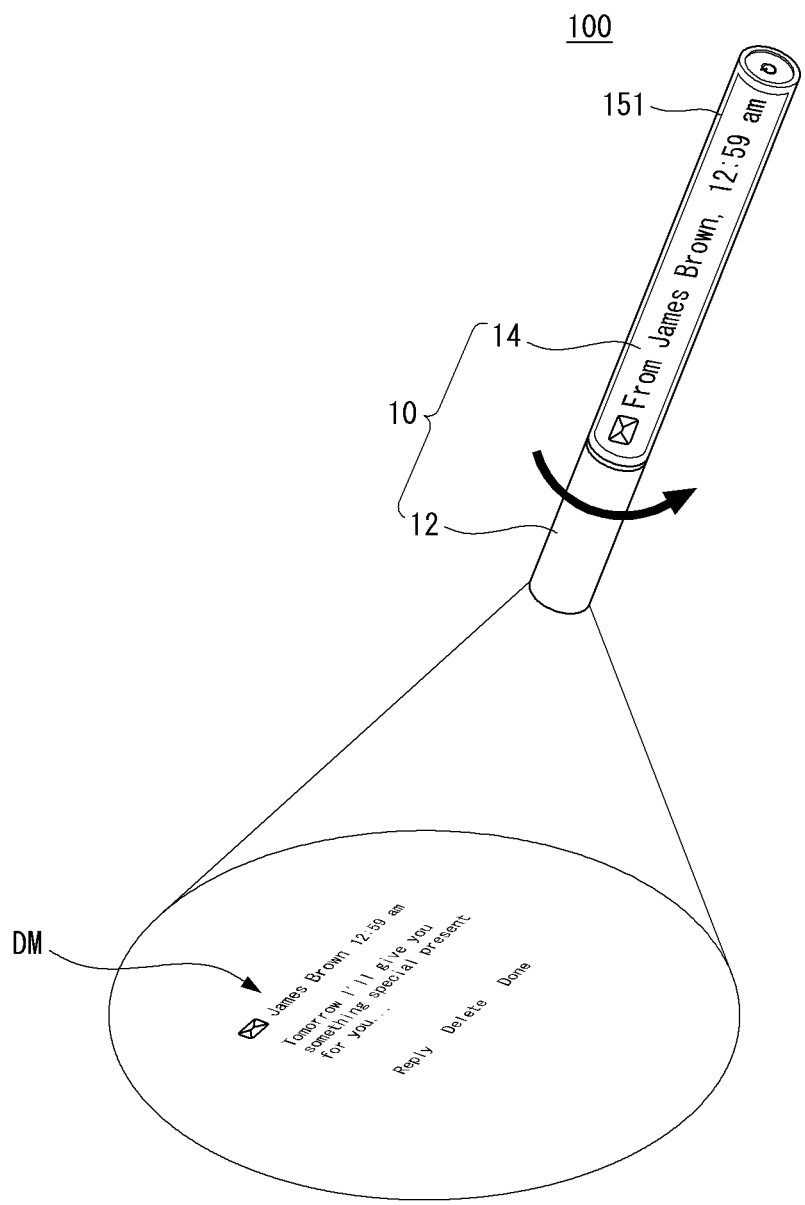
Figure 34:
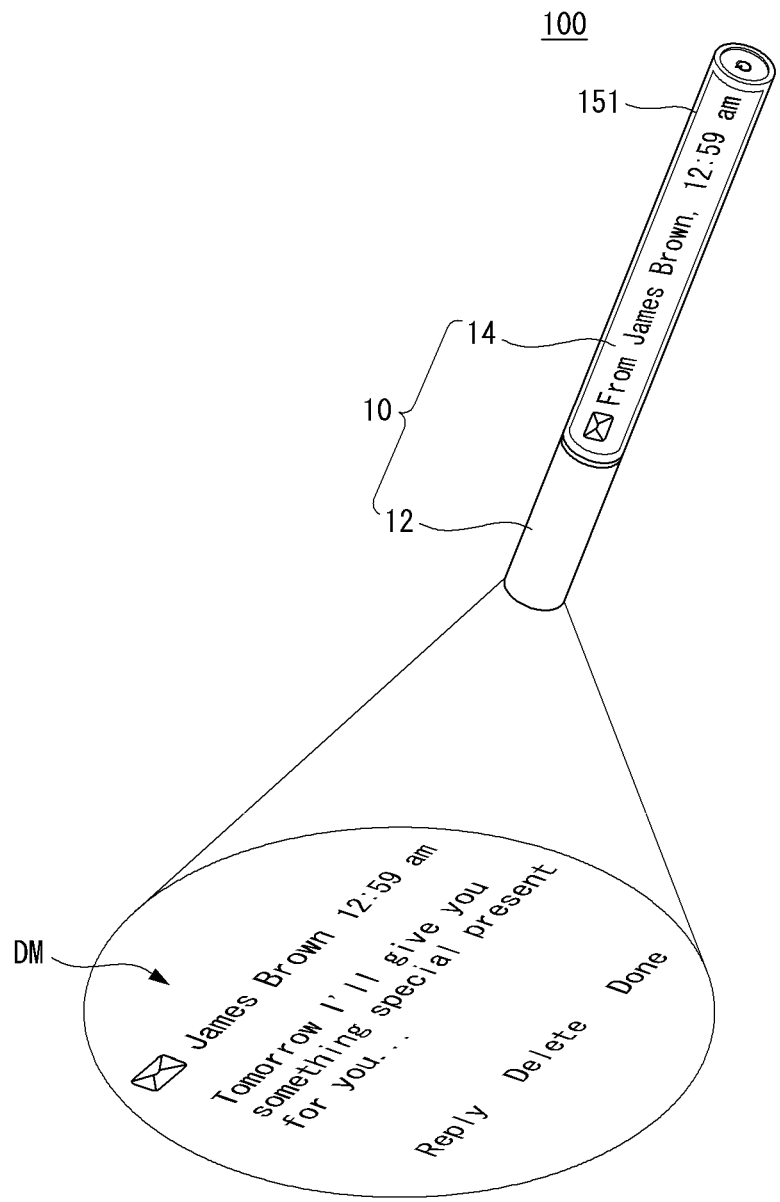

FIGS. 33 and 34 illustrate another example of displaying content according to an embodiment of the present invention.

The controller 180 may change the size of a displayed image according to a predetermined motion, such as turning the stick body 10 of the mobile terminal 100.

As illustrated in FIG. 33, a received message DM may be displayed via the projector module 155. If the letters included in the displayed message DM are small, the user can rotate the stick body 10 in a specific direction to enlarge the size of the letters. Specifically, the user can rotate the stick body 10 clockwise or counterclockwise on the axis of the stick body 10. Alternatively, the user can rotate the first stick body 12 with respect to the second stick body 14.

As illustrated in FIG. 34, the controller 180 can magnify the displayed image in response to the user's gesture (FIG. 33). FIGS. 33 and 34 illustrate the operation of magnifying the displayed image, nonetheless, an operation of reducing the displayed image can be performed in the same manner.

Figure 35:
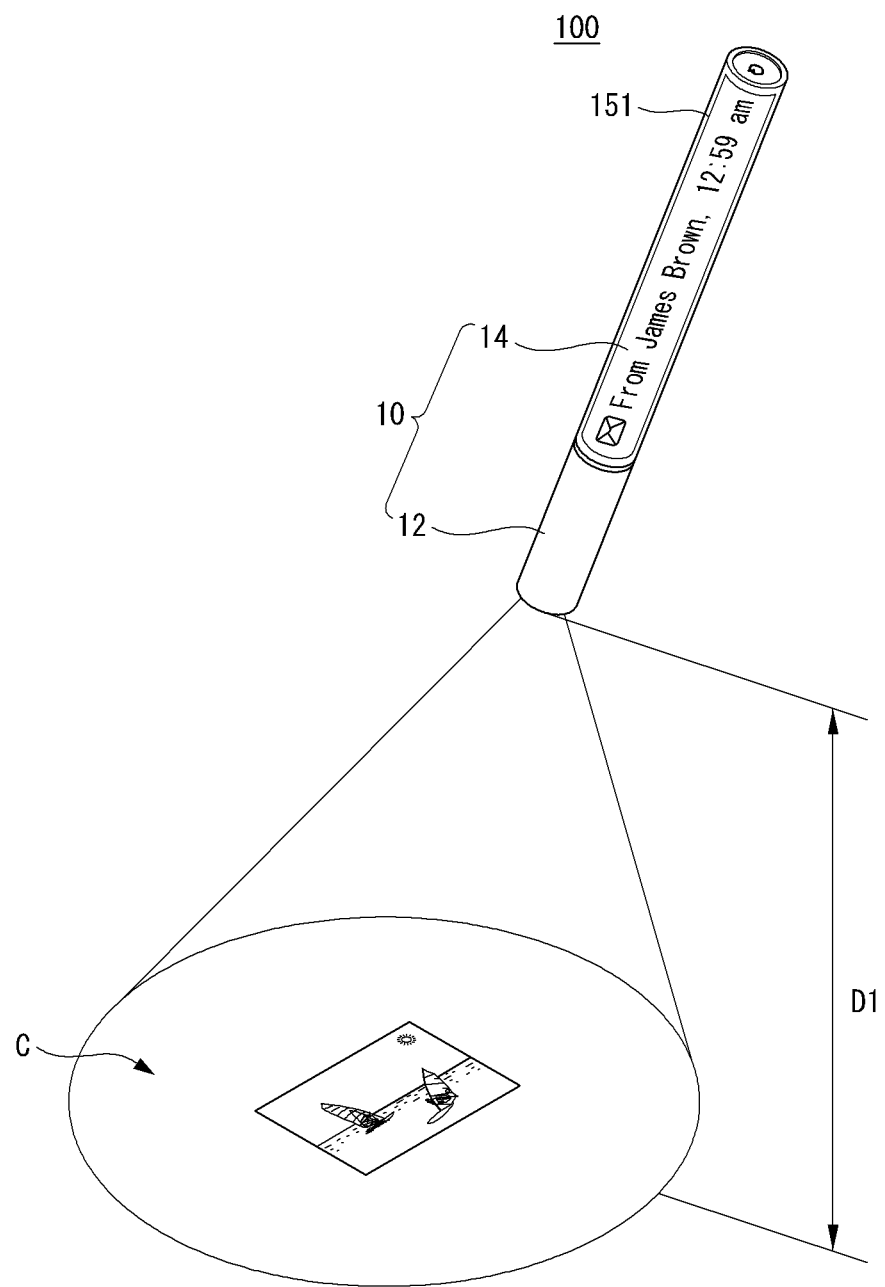
Figure 36:
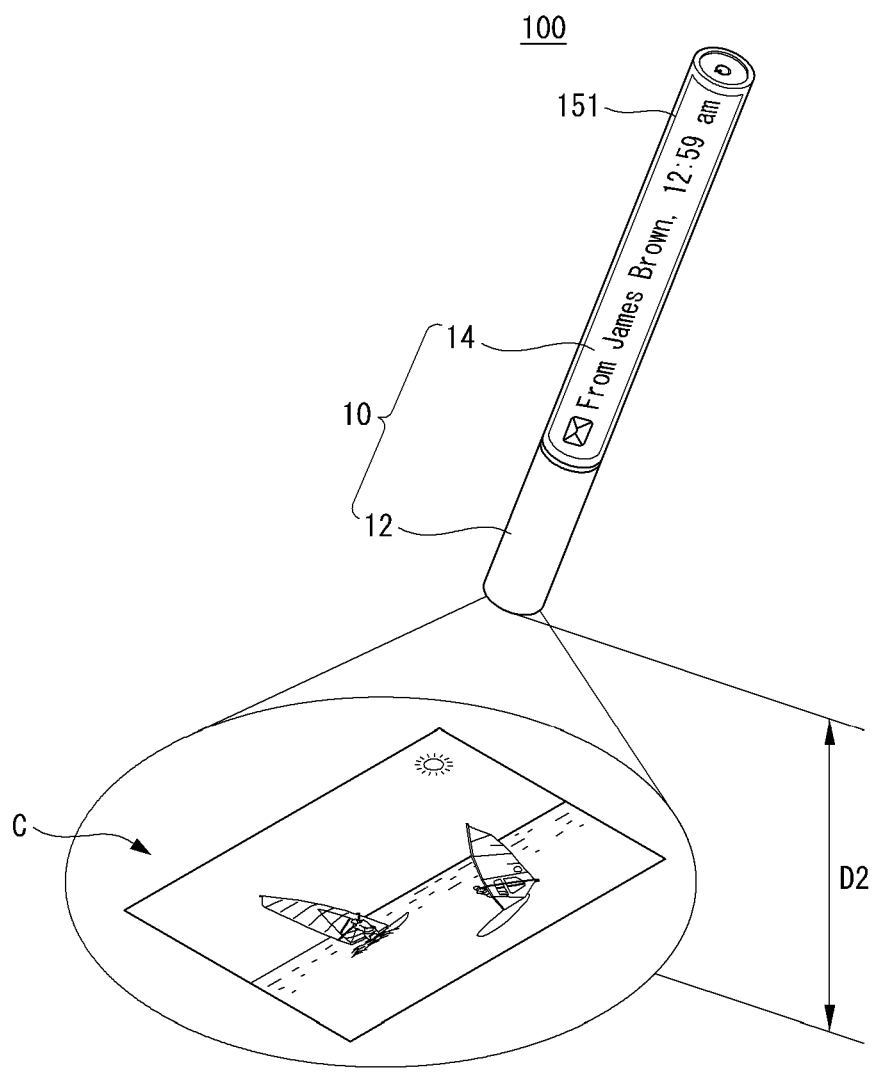

FIGS. 35 and 36 illustrate another example of displaying content according to an embodiment of the present invention.

The controller 180 can adjust the size of the displayed image according to the distance between the mobile terminal 100 and the displayed content C. As illustrated in FIG. 35, the distance between the displayed content C and the mobile terminal 100 may be a first distance D1.

As illustrated in FIG. 36, when the user moves the mobile terminal 100 towards the content C to reduce the first distance D1 between the mobile terminal 100 and the content C to a second distance D2, which is less than the first distance D1, the content C can be magnified. The distance between the displayed content C and the mobile terminal 100 can be detected by a distance sensor.

The above-described method of controlling the mobile terminal may be written as a computer program and may be implemented in a digital microprocessor that execute the programs using a computer readable recording medium. The method of controlling the mobile terminal may be executed via software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of this document. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
an elongated body having a central axis and being structured to form an outer side having a circumference;
a motion sensor, disposed on the elongated body, configured to detect a movement of the elongated body;
a touch screen positioned relative to the elongated body to cooperatively form at least a portion of the outer side of the elongated body, and configured to receive user input responsive to contact with the touch screen;
a projector positioned at an end portion of the elongated body and being configured to project an image onto a surface; and
a controller configured to:
receive a particular event,
cause the touch screen to display representative information of the received particular event, wherein the displaying of the representative information occurs after receiving of the particular event,
activate the projector,
cause the activated projector to display entire information corresponding to the received particular event, wherein the entire information includes information that is not displayed on the touch screen,
change the entire information to another information corresponding to the displayed representative information when the motion sensor detects the movement of the elongated body, and
cause the touch screen to display characters corresponding to the movement of the elongated body.

2. The mobile terminal of claim 1, wherein the elongated body includes a first body and a second body connected with each to permit relative rotation between the first body and the second body.

3. The mobile terminal of claim 1, further comprising a camera, wherein the camera is coupled to the elongated body and is arranged to face a direction in which the projector projects the image.

4. The mobile terminal of claim 3, wherein the controller is configured to activate the camera when the projector is activated.

5. The mobile terminal of claim 1, wherein an optical axis of the projected image is substantially parallel to the central axis.

6. The mobile terminal of claim 1, further comprising
a motion sensor, disposed on the elongated body, configured to detect a movement of the elongated body, and wherein the controller is further configured to:
change the at least one of entire information to another information corresponding to the displayed representative information when the motion sensor detects the movement of the elongated body.

7. A mobile terminal comprising:
a body;
a projector, disposed on one end of the body, configured to project an image;
a motion sensor configured to detect a movement of the body;
a camera configured to detect an input on the image projected via the projector; and
a controller configured to:
activate the camera and the projector and deactivate the motion sensor when the mobile terminal enters into a first character input mode,
cause the activated projector to display virtual keys,
receive characters selected by a user via the activated camera,
activate the motion sensor and the projector and deactivate the camera when the mobile terminal enters into a second character input mode,
detect the movement of the body via the activated motion sensor,
receive characters by analyzing the detected movement.

8. The mobile terminal of claim 7, wherein the first character input mode is associated with at least a SMS message creating mode, an email creating mode, or a memo creating mode and the second character input mode corresponds to at least a MMS message creating mode or a picture drawing mode.

9. The mobile terminal of claim 7, wherein the camera photographs the input within a display range of the image projected by the projector.

10. The mobile terminal of claim 7, wherein the virtual keys are displayed in the form of QWERTY keyboard.

11. The mobile terminal of claim 7, wherein the controller displays the received characters on the touch screen.

12. The mobile terminal of claim 11, wherein the controller displays the received characters in response to the trace of the motion when the second character input mode is activated.

13. The mobile terminal of claim 7, further comprising a touch screen having a curved surface structured to form at least a portion of the external circumference of the body.

14. A method of controlling a mobile terminal, the method comprising:
activating a camera and a projector and deactivating a motion sensor when the mobile terminal enters into a first character input mode,
displaying virtual keys via the activated projector,
receiving characters selected by a user via the activated camera,
activating the motion sensor and the projector and deactivating the camera when the mobile terminal enters into a second character input mode,
detecting movement of a body of the mobile terminal via the activated motion sensor, and
receiving characters by analyzing the detected movement.

15. The method of claim 14, wherein the second character input mode displays the received characters via the projector according to a trace of the movement of the body.

* * * * *